US012755213B2

(12) United States Patent
Zhang et al.

(10) Patent No.: US 12,755,213 B2
(45) Date of Patent: Oct. 6, 2026

(54) HYBRID LANGUAGE MODEL AND DETERMINISTIC PROCESSING FOR UNCERTAINTY ANALYSIS

(71) Applicant: Citibank, N.A., New York, NY (US)

(72) Inventors: Yuxuan Zhang, Kowloon (HK); Geoffrey Robichaux, London (GB); Jason Ryan Engelbrecht, London (GB); Matthias Pronin, Tel Aviv (IL); Hardik Sanchawat, London (GB); Guanqiu Zheng, Kowloon (HK); Amir Ghoncheh, London (GB)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/265,958

(22) Filed: Jul. 10, 2025

(65) Prior Publication Data

US 2025/0342406 A1 Nov. 6, 2025

Related U.S. Application Data

(63) Continuation-in-part of application No. 19/038,662, filed on Jan. 27, 2025, which is a continuation of application No. 18/781,985, filed on Jul. 23, 2024, now Pat. No. 12,210,949, application No. 19/265,958 is a continuation-in-part of application No. 18/535,001, filed on Dec. 11, 2023, now Pat. No. 12,045,610, and a continuation-in-part of application No. 19/061,982, filed on Feb. 24, 2025, which is a continuation-in-part of application No. 18/781,965, (Continued)

(51) Int. Cl.
*G06N 20/20* (2019.01)

(52) U.S. Cl.
CPC .................................. *G06N 20/20* (2019.01)

(58) Field of Classification Search
CPC ...................................................... G06N 20/20
USPC .......................................................... 706/12
See application file for complete search history.

(56) References Cited

U.S. PATENT DOCUMENTS 10,438,212 B1 10/2019 Jilani et al.
10,764,150 B1 9/2020 Hermoni et al.

(Continued)

OTHER PUBLICATIONS

Tatug et al., "Document categorization with modified statistical language models for agglutinative languages", International Journal of Computational Intelligence Systems, vol. 3, No. 5, Oct. 2010 (Year: 2010).*

(Continued)

*Primary Examiner* — Tsu-Chang Lee
(74) *Attorney, Agent, or Firm* — Ashurst Perkins Coie LLP; Sumedha Ahuja; Alice Jenkins

(57) ABSTRACT

Systems, methods, and devices that relate to assessing uncertainty associated with entities are disclosed. In one example aspect, the method receives artifacts relating to an entity and categories for assessing uncertainty. For each category, a generative model retrieves and standardizes data points from the artifacts. A rule-based model inputs the standardized data points to output a rating. The generative model then generates an assessment of the rating and data points according to a predefined structure. The method outputs a summary, rating, and standardized data points for each category. These outputs can be used by other systems for assessing the uncertainty of the entity and taking action based on the assessment.

20 Claims, 8 Drawing Sheets

Related U.S. Application Data filed on Jul. 23, 2024, now Pat. No. 12,271,720, which is a continuation-in-part of application No. 18/535,001, filed on Dec. 11, 2023, now Pat. No. 12,045,610, application No. 19/265,958 is a continuation-in-part of application No. PCT/US2024/051150, filed on Oct. 11, 2024, which is a continuation of application No. 18/781,985, filed on Jul. 23, 2024, now Pat. No. 12,210,949, and a continuation of application No. 18/781,965, filed on Jul. 23, 2024, now Pat. No. 12,271,720, and a continuation of application No. 18/781,977, filed on Jul. 23, 2024, now Pat. No. 12,210,858, and a continuation of application No. 18/669,421, filed on May 20, 2024, now Pat. No. 12,182,539, and a continuation of application No. 18/535,001, filed on Dec. 11, 2023, now Pat. No. 12,045,610, application No. 19/265,958 is a continuation-in-part of application No. 18/951,120, filed on Nov. 18, 2024, which is a continuation of application No. 18/633,293, filed on Apr. 11, 2024, now Pat. No. 12,147,513, application No. 19/265,958 is a continuation-in-part of application No. 18/907,414, filed on Oct. 4, 2024, which is a continuation of application No. 18/661,532, filed on May 10, 2024, now Pat. No. 12,111,747, which is a continuation-in-part of application No. 18/661,519, filed on May 10, 2024, now Pat. No. 12,106,205, which is a continuation-in-part of application No. 18/633,293, filed on Apr. 11, 2024, now Pat. No. 12,147,513.

(56) References Cited

U.S. PATENT DOCUMENTS

| | | | | |
|---|---|---|---|---|
| 11,153,177 | B1 | 10/2021 | Hermoni et al. | |
| 11,676,685 | B2 | 6/2023 | Jaganathan et al. | |
| 12,008,332 | B1 * | 6/2024 | Gardner | G06F 40/56 |
| 2017/0061132 | A1 | 3/2017 | Hovor et al. | |
| 2020/0334326 | A1 | 10/2020 | Zhang et al. | |
| 2022/0179906 | A1 | 6/2022 | Desai et al. | |
| 2023/0252393 | A1 | 8/2023 | Orzechowski et al. | |
| 2024/0256678 | A1 | 8/2024 | Thompson | |
| 2025/0103813 | A1 * | 3/2025 | Zhang | G06F 40/295 |

OTHER PUBLICATIONS

Sun et al., "Text classification via large language models", arXiv: 2305.08377v3 [cs.CL] Oct. 9, 2023 (Year: 2023).*

Gao et al., "The use of categorization information in language models for questions retrieval", CIKM'09, Nov. 206, 2009 (Year: 2009).*

Behravesh et al, "Rule Modeling Engine for Optimizing Complex Event Processing Patterns", IEEE, pp. 128-135 (Year: 2009).

* cited by examiner

HYBRID LANGUAGE MODEL AND DETERMINISTIC PROCESSING FOR UNCERTAINTY ANALYSIS

CROSS-REFERENCE TO RELATED APPLICATIONS

This application is a continuation-in-part of U.S. patent application Ser. No. 19/038,662, filed Jan. 27, 2025, entitled "SYSTEMS AND METHODS FOR DETECTING REQUIRED RULE ENGINE UPDATED USING ARTIFICIAL INTELLIGENCE MODELS," which is a continuation of U.S. patent application Ser. No. 18/781,985, filed Jul. 23, 2024, entitled "SYSTEMS AND METHODS FOR DETECTING REQUIRED RULE ENGINE UPDATED USING ARTIFICIAL INTELLIGENCE MODELS," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA." U.S. patent application Ser. No. 19/038,662 is further related to U.S. patent application Ser. No. 18/669,421, filed May 20, 2024, entitled "SYSTEMS AND METHODS FOR MODIFYING DECISION ENGINES DURING SOFTWARE DEVELOPMENT USING VARIABLE DEPLOYMENT CRITERIA," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA."

This application is further a continuation-in-part of U.S. patent application Ser. No. 19/061,982, filed Feb. 24, 2025, entitled "SYSTEMS AND METHODS FOR GENERATING ARTIFICIAL INTELLIGENCE MODELS AND/OR RULE ENGINES WITHOUT REQUIRING TRAINING DATA THAT IS SPECIFIC TO MODEL COMPONENTS AND OBJECTIVES," which is a continuation-in-part of U.S. patent application Ser. No. 18/781,965, filed Jul. 23, 2024, entitled "SYSTEMS AND METHODS FOR DETECTING REQUIRED RULE ENGINE UPDATES USING ARTIFICIAL INTELLIGENCE MODELS," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA." U.S. patent application Ser. No. 19/061,982 is further related to U.S. patent application Ser. No. 19/038,662, filed Jan. 27, 2025, entitled "SYSTEMS AND METHODS FOR DETECTING REQUIRED RULE ENGINE UPDATED USING ARTIFICIAL INTELLIGENCE MODELS," which is a continuation of U.S. patent application Ser. No. 18/781,985, filed Jul. 23, 2024, entitled "SYSTEMS AND METHODS FOR DETECTING REQUIRED RULE ENGINE UPDATED USING ARTIFICIAL INTELLIGENCE MODELS," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA." U.S. patent application Ser. No. 19/061,982 is further related to U.S. patent application Ser. No. 18/669,421, filed May 20, 2024, entitled "SYSTEMS AND METHODS FOR MODIFYING DECISION ENGINES DURING SOFTWARE DEVELOPMENT USING VARIABLE DEPLOYMENT CRITERIA," which is a continuation-in-part of U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA."

This application is further a continuation-in-part of International PCT Patent Application No. PCT/US2024/51150, filed Oct. 11, 2024, which claims the benefit of priority of U.S. patent application Ser. No. 18/669,421, filed May 20, 2024, entitled "SYSTEMS AND METHODS FOR MODIFYING DECISION ENGINES DURING SOFTWARE DEVELOPMENT USING VARIABLE DEPLOYMENT CRITERIA," U.S. patent application Ser. No. 18/535,001, filed Dec. 11, 2023, entitled "SYSTEMS AND METHODS FOR UPDATING RULE ENGINES DURING SOFTWARE DEVELOPMENT USING GENERATED PROXY MODELS WITH PREDEFINED MODEL DEPLOYMENT CRITERIA," U.S. patent application Ser. No. 18/781,965, filed Jul. 23, 2024, entitled "SYSTEMS AND METHODS FOR DETECTING REQUIRED RULE ENGINE UPDATES USING ARTIFICIAL INTELLIGENCE MODELS," U.S. patent application Ser. No. 18/781,977, filed Jul. 23, 2024, entitled "SYSTEMS AND METHODS FOR DETECTING REQUIRED RULE ENGINE UPDATED USING ARTIFICIAL INTELLIGENCE MODELS," and U.S. patent application Ser. No. 18/781,985, filed Jul. 23, 2024, entitled "SYSTEMS AND METHODS FOR DETECTING REQUIRED RULE ENGINE UPDATED USING ARTIFICIAL INTELLIGENCE MODELS."

This application is further a continuation-in-part of U.S. patent application Ser. No. 18/951,120, filed Nov. 18, 2024, entitled "DYNAMIC EVALUATION OF LANGUAGE MODEL PROMPTS FOR MODEL SELECTION AND OUTPUT VALIDATION AND METHODS AND SYSTEMS OF THE SAME," which is a continuation of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 18/907,414, filed Oct. 4, 2024, entitled "DYNAMIC INPUT-SENSITIVE VALIDATION OF MACHINE LEARNING MODEL OUTPUTS AND METHODS AND SYSTEMS OF THE SAME," which is a continuation of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S patent application Ser. No. 19/411,087, filed Dec. 5, 2025, entitled "PROMPT REFINEFMENT TO IMPROVE ACCURACY OF OUTPUTS FROM MACHINE LEARN- ING MODELS" which is a continuation of U.S. patent application Ser. No. 19/188,116, filed Apr. 24, 2025, entitled "PROMPT REFINEMENT TO IMPROVE ACCURACY OF OUTPUTS FROM MACHINE LEARNING MODELS" which is a continuation-in-part of U.S. patent application Ser. No. 18/954,389, filed Nov. 20, 2024, entitled "DYNAMIC SYSTEM RESOURCE-SENSITIVE MODEL SOFTWARE AND HARDWARE SELECTION," which is a continuation of U.S. patent application Ser. No. 18/812,913, filed Aug. 22, 2024, entitled "DYNAMIC SYSTEM RESOURCE-SENSITIVE MODEL SOFTWARE AND HARDWARE SELECTION," which is a continuation-in-part of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 19/204,706, filed May 12, 2025, entitled LATENCY-, ACCURACY-, AND PRIVACY-SENSITIVE TUNING OF ARTIFICIAL INTELLIGENCE MODEL SELECTION PARAMETERS AND SYSTEMS AND METHODS OF THE SAME, which is a continuation of U.S. patent application Ser. No. 18/830,573, filed Sep. 11, 2024, entitled LATENCY-, ACCURACY-, AND PRIVACY-SENSITIVE TUNING OF ARTIFICIAL INTELLIGENCE MODEL SELECTION PARAMETERS AND SYSTEMS AND METHODS OF THE SAME, which is a continuation-in-part of U.S. patent application Ser. No. 18/821,880, filed Aug. 30, 2024, entitled SYSTEM-SENSITIVE MACHINE LEARNING MODEL SELECTION AND OUTPUT GENERATION AND SYSTEMS AND METHODS OF THE SAME, which is a continuation-in-part of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

The content of the foregoing applications is incorporated herein by reference in its entirety.

BACKGROUND

Document processing systems have become increasingly prevalent across various industries as organizations seek to automate the analysis and extraction of information from large volumes of textual content. These systems typically involve the conversion of unstructured or semi-structured documents into structured data that can be processed by computer systems. Traditional document processing approaches often rely on optical character recognition, keyword matching, and rule-based extraction methods to identify and extract relevant information from documents.

Large language models represent a class of artificial intelligence systems trained on vast amounts of text data to understand and generate human language. These models utilize deep learning architectures, particularly transformer networks, to process and analyze textual content at scale. Large language models can perform various natural language processing tasks including text classification, information extraction, summarization, and language translation. The models are typically pre-trained on diverse text corpora and can be fine-tuned for specific applications or domains.

Machine learning encompasses a broad category of computational methods that enable systems to learn patterns and make predictions from data without being explicitly programmed for each specific task. Traditional machine learning approaches include supervised learning, where models are trained on labeled datasets, and unsupervised learning, where patterns are discovered in unlabeled data. Rule-based systems, in contrast, operate using predefined logical conditions and decision trees that process inputs according to predetermined criteria. These deterministic systems provide consistent and explainable outputs based on established rules and thresholds.

SUMMARY

Attempting to create a system to process and analyze complex multi-entity documents using large language models in view of the available conventional approaches created significant technological uncertainty. Creating such a system required addressing several unknowns in conventional approaches to document processing and intelligent data extraction, such as how to reliably identify and extract relevant information from documents containing multiple entities while maintaining accuracy and consistency. Similarly, conventional approaches to manual document analysis did not provide consistent results across different languages and jurisdictions, which presented uncertainty regarding the scalability and reliability of multi-language document processing systems.

Conventional approaches rely on manual human analysis and simple keyword-based extraction methods, which do not scale efficiently and are prone to errors and inconsistencies. For example, a conventional system requires analysts to manually review documents for up to several hours and often fails to maintain consistency across different reviewers or geographic regions. Conventional approaches typically involve manual document review and basic text search functionality, which do not adapt to evolving terminology or handle complex semantic relationships within documents. When automated solutions are attempted, they often suffer from hallucination problems and lack the deterministic control needed for regulated environments. Conversely, the disclosed system leverages a hybrid approach combining large language models with deterministic rule engines to provide accurate, consistent, and explainable document analysis.

Additionally, the need to process documents containing multiple entities and overlapping information created further technological uncertainty since legacy manual processes often cannot accurately distinguish between different entities within a single document or identify which portions of content apply to specific entities. Legacy keyword-based extraction systems often fail to understand semantic relationships and context, leading to extraction of irrelevant or conflicting information. To successfully integrate large language model capabilities with deterministic processing requirements, factors such as hallucination control, explainability, traceability, and multi-language semantic understanding must be taken into consideration.

To overcome the technological uncertainties, the inventors systematically evaluated multiple design alternatives. For example, the inventors experimented with different methods for combining generative artificial intelligence with traditional machine learning approaches. The inventors tested various strategies for document segmentation and entity identification, which allowed the inventors to develop techniques for accurately isolating relevant content within complex multi-entity documents.

The use of purely automated systems as an alternative proved to be unreliable as it failed to provide consistent and accurate results, leading to high error rates and lack of explainability. Similarly, reliance solely on large language models did not provide the deterministic control required for regulated environments and introduced high levels of hallucination. Further, using only traditional rule-based systems forewent the potential benefits of advanced natural language understanding capabilities, such as the ability to adapt to evolving terminology and multi-language requirements.

Thus, the inventors experimented with different methods for integrating large language models with deterministic processing engines. For example, the inventors tested segmented processing approaches where large language models handle document understanding and data extraction while deterministic engines handle decision-making and classification to identify the most efficient and effective approaches. Additionally, the inventors systematically evaluated different strategies for maintaining explainability and traceability throughout the processing pipeline. The inventors evaluated, for example, different methods of prompt engineering and chain-of-thought processing, such as decomposing complex extraction tasks into smaller sub-problems and implementing multistep validation processes.

This patent document discloses systems and methods to address the aforementioned challenges of conventional systems by providing a hybrid approach that combines the semantic understanding capabilities of large language models with the consistency and explainability of deterministic rule engines. The system can process complex documents containing multiple entities and extract relevant information with high accuracy while maintaining full traceability and explainability of results. By leveraging advanced prompt engineering and document segmentation techniques, the system can identify and isolate content relevant to specific entities within multi-entity documents, eliminating confusion and conflicting information that plague conventional approaches.

In particular, the disclosed system employs a multistage processing pipeline that first uses large language models to understand document structure and identify entity boundaries, then extracts relevant data points using guided prompts, and finally applies deterministic rules to generate consistent ratings. This approach can minimize hallucination and subjectivity while maximizing the benefits of advanced natural language processing capabilities. The system can provide detailed rationales and citations for all extracted information, enabling human reviewers to validate results and maintain regulatory compliance.

The system can adapt to multiple languages and evolving terminology through the semantic understanding capabilities of large language models while maintaining consistency through deterministic processing rules. This enables the system to handle documents across different jurisdictions and languages without requiring separate implementations for each region. The modular architecture allows for easy updates to processing rules and criteria without requiring retraining of language models, providing flexibility to adapt to changing regulatory requirements while maintaining system stability and performance.

Figure 1:
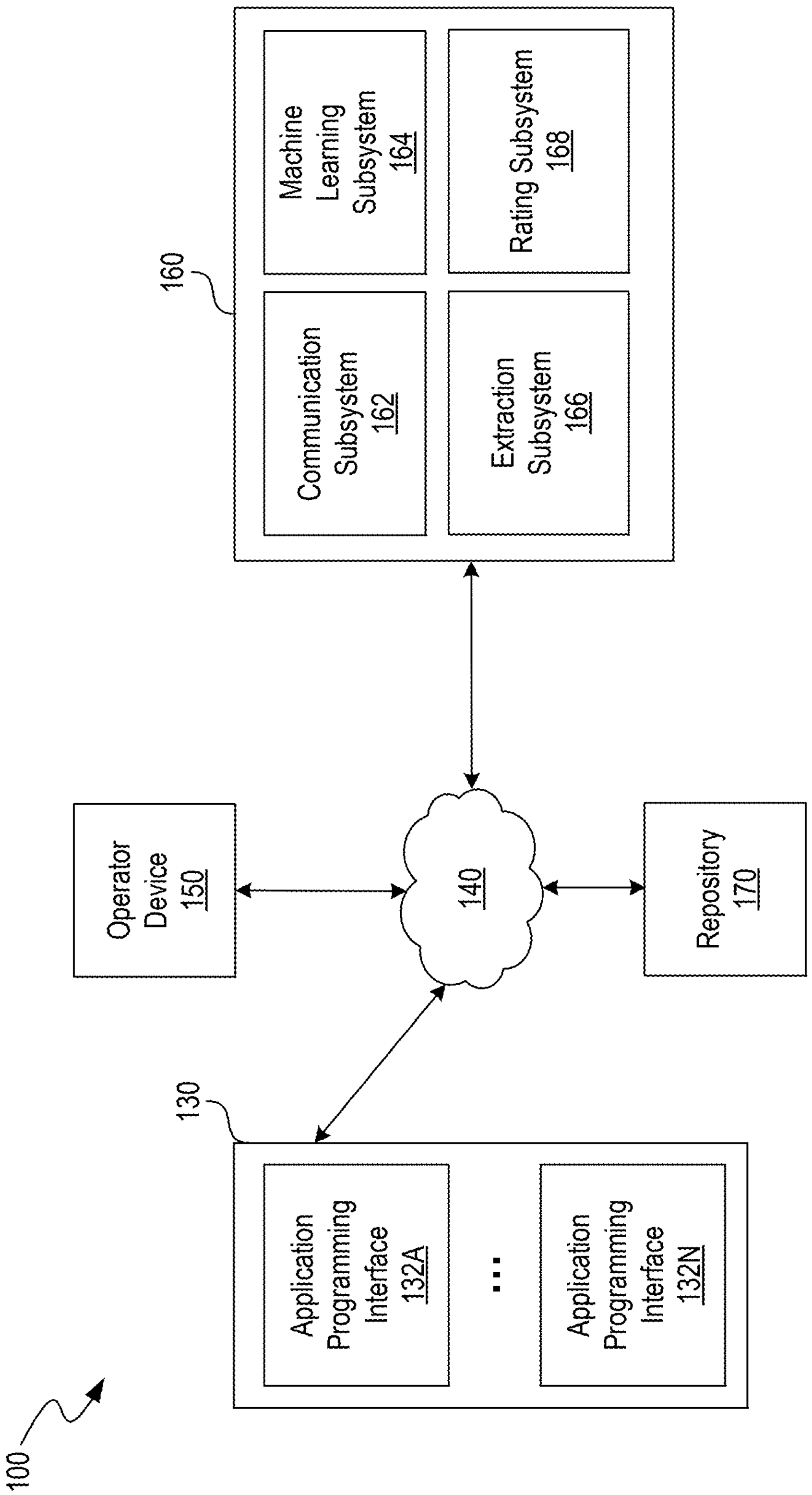
FIG. 1 shows an illustrative system for analyzing entity uncertainty, in accordance with one or more implementations of this disclosure.

The technologies described herein will become more apparent to those skilled in the art from studying the Detailed Description in conjunction with the drawings. Implementations or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the disclosed implementations. It will be appreciated, however, by those having skill in the art, that the implementations can be practiced without these specific details or with an equivalent arrangement. In other cases, well-known models and devices are shown in block diagram form in order to avoid unnecessarily obscuring the disclosed implementations.

The disclosed technology provides a system and method for assessing uncertainty associated with entities through a hybrid approach combining generative models and rule-based systems. The method receives a plurality of artifacts relating to an entity and retrieves categories for assessing uncertainty levels. For each category, a generative model extracts relevant data points from the artifacts and standardizes them according to defined criteria. These standardized data points are then input into a rule-based model that applies specific rules to generate a rating for the category. The rating and standardized data points are subsequently fed back into the generative model, which generates a structured assessment summarizing the findings. The system outputs comprehensive information for each category, including summaries, ratings, and standardized data points, enabling organizations to make informed decisions based on well-documented uncertainty assessments with full traceability and explainability.

FIG. 1 shows an illustrative system 100 for analyzing entity uncertainty, in accordance with one or more implementations of this disclosure. For example, the system 100 can be used to assess uncertainty associated with entities through a combination of generative and deterministic processing. In some implementations, the system 100 can utilize techniques such as large language models, rule-based systems, and standardized data processing in order to perform entity uncertainty assessment. For example, the system 100 can include an uncertainty assessment system 160 able to perform comprehensive uncertainty analysis operations. The uncertainty assessment system 160 can include software, hardware, or a combination of the two. For example, the uncertainty assessment system 160 can be a physical server or a virtual server that is running on a physical computer system. In some implementations, the uncertainty assessment system 160 can be configured on a user device (e.g., a laptop computer, a smartphone, a desktop computer, an electronic tablet, or another suitable user device) and configured to execute instructions for assessing entity uncertainty using a hybrid model approach. In particular, the uncertainty assessment system 160 can include several subsystems, each configured to perform one or more steps of the methods described herein, such as a communication subsystem 162, a machine learning subsystem 164, an extraction subsystem 166, and a rating subsystem 168.

As described herein, the uncertainty assessment system 160 can obtain data to determine the appropriate uncertainty levels for an entity. The uncertainty assessment system 160 can retrieve data or sources of data from databases or data stores. In some implementations, the uncertainty assessment system 160 can retrieve data or sources of data from a repository 170, discussed in greater detail below. As described herein, an uncertainty assessment system can be any system (e.g., computer, device, node, etc.) that is enabled to execute one or more tools for assessing entity uncertainty or enabled to execute tasks for which data can be passively collected. The uncertainty assessment system 160 can be configured to receive the data via a communication network 140 at the communication subsystem 162. The communication network 140 can be a local area network (LAN), a wide area network (WAN—e.g., the internet), or a combination of the two. The communication network 140 can connect the communication subsystem 162 to one or more application programming interfaces (APIs) 130, such as API 132A-132N. The communication subsystem 162 can include software components, hardware components, or a combination of both. For example, the communication subsystem 162 can include a network card (e.g., a wireless network card or a wired network card) that is associated with software to drive the card. The communication subsystem 162 can pass at least a portion of the data, or a pointer to the data in memory, to other subsystems, such as the machine learning subsystem 164, the extraction subsystem 166, and the rating subsystem 168.

According to some implementations, the uncertainty assessment system 160 can obtain such data by generating one or more commands to execute entity uncertainty assessment operations. In some examples, the command(s) can specify a specific timeframe for obtaining the data (e.g., explicitly by identifying the timeframe via a start and an end time or implicitly by requesting data from a current block of time). Additionally, the system 100 can include the repository 170, which can store historical data, stored data, machine learning model parameters, and system commands. In some implementations, the repository 170 can store preconfigured commands related to assessing entity uncertainty using hybrid generative and deterministic models, which can be used by the uncertainty assessment system 160 to manage uncertainty assessment dynamically. The repository 170 can also include metadata or tags associated with stored data, such as identifiers, policies, or patterns. The uncertainty assessment system 160 can retrieve data from the repository 170 to refine its assessments, optimize outcomes, and improve the accuracy of entity uncertainty evaluation. Additionally, the repository 170 can store standardized data points used to update the hybrid assessment model based on newly collected data, ensuring adaptive and evolving uncertainty evaluations.

The system 100 can further include an operator device 150, which can receive alerts generated by the uncertainty assessment system 160 when an uncertainty assessment requires review or when ratings indicate high levels of uncertainty in critical categories. The operator device 150 can be a desktop computer, mobile device, or other suitable user interface (UI) through which an operator can review assessment results and monitor outcomes, such as high uncertainty ratings or inconsistent data points. The uncertainty assessment system 160 can transmit structured assessments to the operator device 150 to provide insight into uncertainty evaluations and supporting evidence.

Figure 2:
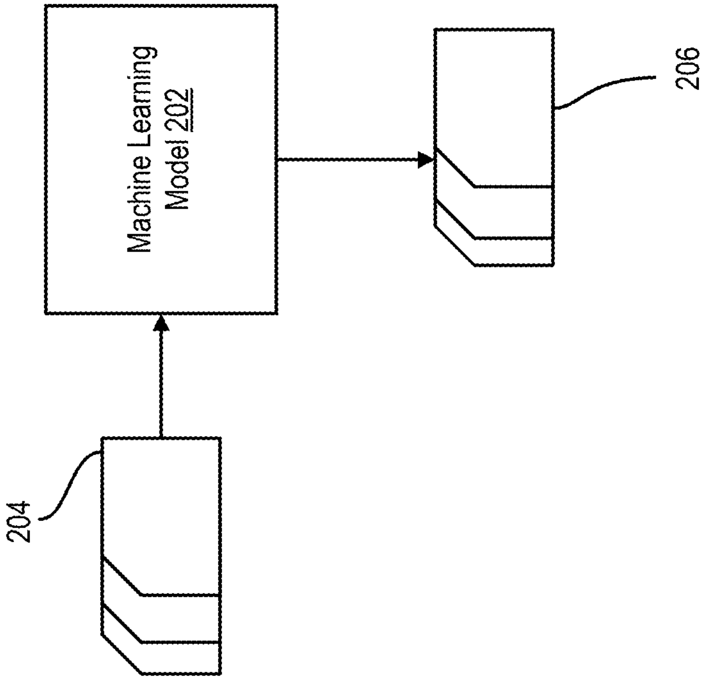
FIG. 2 illustrates an exemplary machine learning model, in accordance with one or more implementations of this disclosure.

FIG. 2 illustrates an exemplary machine learning model 202, in accordance with one or more implementations of this disclosure. The machine learning model 202 can be an artificial intelligence (AI) model, such as a generative model, or another model. According to some examples, the machine learning model can be any model, such as a model for data extraction and standardization. In some implementations, the machine learning model 202 can be trained to intake input 204, including input data and requests received. As a result of inputting the input 204 into the machine learning model 202, the machine learning model 202 can then output an output 206. As described herein, the input data can include data such as requests or prompts. In particular, the machine learning model 202 can receive entity artifacts and categories for uncertainty assessment.

For example, the output 206 can include standardized data points and structured assessments based on the entity artifacts and uncertainty categories. Furthermore, as described, the machine learning model 202 can be configured to output detailed citations and explanations regarding the outputs. The machine learning model 202 can be trained on a training dataset containing a plurality of entity examples and assessments, such as verified uncertainty ratings and standardized data points that were identified by operators. For example, the machine learning model 202 is described in relation to FIG. 2 herein.

The output parameters can be fed back to the machine learning model 202 as input to train the machine learning model 202 (e.g., alone or in conjunction with user indications of the accuracy of outputs, labels associated with the inputs, or other reference feedback information). The machine learning model 202 can update its configurations (e.g., weights, biases, or other parameters) based on the assessment of its prediction and reference feedback information (e.g., user indication of accuracy, reference labels, or other information). Connection weights can be adjusted, for example, if the machine learning model 202 is a neural network to reconcile differences between the neural network's prediction and the reference feedback regarding uncertainty assessments (e.g., entity uncertainty ratings).

One or more neurons of the neural network can require that their respective errors be sent backward through the neural network to facilitate the update process (e.g., back-propagation of error). Updates to the connection weights can, for example, be reflective of the magnitude of error propagated backward after a forward pass has been completed. In this way, for example, the machine learning model can be trained to generate better predictions.

In some implementations, the machine learning model 202 can include an artificial neural network. In such implementations, the machine learning model 202 can include an input layer and one or more hidden layers. Each neural unit of the machine learning model 202 can be connected to one or more other neural units of the machine learning model 202. Such connections can be enforcing or inhibitory in their effect on the activation state of connected neural units. Each individual neural unit can have a summation function that combines the values of all of its inputs together. Each connection (or the neural unit itself) can have a threshold function that a signal must surpass before it propagates to other neural units. The machine learning model 202 can be self-learning or trained rather than explicitly programmed and can perform significantly better in certain areas of problem-solving as compared to computer programs that do not use machine learning. During training, an output layer of the machine learning model 202 can correspond to a standardized data point or assessment of the machine learning model 202, and an input known to correspond to that standardized data point or assessment can be input into an input layer of the machine learning model 202 during training. During testing, an input without a known standardized data point or assessment can be input into the input layer, and a determined standardized data point or assessment can be output.

The machine learning model 202 can include embedding layers in which each feature of a vector is converted into a dense vector representation. These dense vector representations for each feature can be pooled at one or more subsequent layers to convert the set of embedding vectors into a single vector. The machine learning model 202 can be structured as a factorization machine model. The machine learning model 202 can be a nonlinear model or supervised learning model that can perform extraction or standardization. For example, the machine learning model 202 can be a general-purpose supervised learning algorithm that the uncertainty assessment system 160 uses for both extraction and standardization tasks. Alternatively, the machine learning model 202 can include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer"), and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks, and there can be more complex neural network designs that include feedback connections, skip connections, or other such possible connections between neurons or layers, which are not discussed in detail here.

A deep neural network (DNN) is a type of neural network that has multiple layers or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) as compared, for example, with models with fewer layers. In the present disclosure, the term "machine learning-based model" or, more simply, "machine learning model" can be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset can be a collection of text documents, referred to as a "text corpus" (or simply referred to as a "corpus"). The corpus can represent a language domain (e.g., a single language) or a subject domain (e.g., scientific papers) or can encompass another domain or domains, be they larger or smaller than a single language or subject domain. For example, a relatively large, multilingual, and non-subject-specific corpus can be created by extracting text from online web pages or publicly available social media posts. Training data can be annotated with ground truth labels (e.g., each data entry in the training dataset can be paired with a label) or can be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding machine learning model input (e.g., in the case of an autoencoder) or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model is typically to minimize a loss function or maximize a reward function.

The training data can be a subset of a larger dataset. For example, a dataset can be split into three mutually exclusive subsets: a training set, a validation (or cross-validation) set, and a testing set. The three subsets of data can be used sequentially during machine learning model training. For example, the training set can be first used to train one or more machine learning models, e.g., each machine learning model having a particular architecture, having a particular training procedure, being describable by a set of model hyperparameters, or otherwise being varied from the other of the one or more machine learning models. The validation (or cross-validation) set can then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) can begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) can begin. The output generated from the testing set can be compared with the corresponding desired target values to give a final assessment of the trained machine learning model's accuracy. Other segmentations of the larger dataset or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training can be carried out iteratively until a convergence condition is met (e.g., a predefined maximum number of iterations has been performed, or the value outputted by the machine learning model is sufficiently converged with the desired target value), after which the machine learning model is considered to be sufficiently trained. The values of the learned parameters can then be fixed, and the machine learning model can be deployed to generate output in real-world applications (also referred to as "inference").

In some examples, a trained machine learning model can be fine-tuned, meaning that the values of the learned parameters can be adjusted slightly in order for the machine learning model to better model a specific task. Fine-tuning of a machine learning model typically involves further training the machine learning model on a number of data samples (which can be smaller in number/cardinality than those used to train the model initially) that closely target the specific task. For example, a machine learning model for generating natural language, e.g., for alerts to operators, or commands that have been trained generically on publicly available text corpora can be, e.g., fine-tuned by further training using specific training samples. The specific training samples can be used to generate language in a certain style or in a certain format. For example, the machine learning model can be trained to generate a blog post having a particular style and structure with a given topic.

Some concepts in machine learning-based language models are now discussed. It can be noted that while the term "language model" has been commonly used to refer to a machine learning-based language model, there can exist non-machine learning language models. In the present disclosure, the term "language model" can refer to a machine learning-based language model (e.g., a language model that is implemented using a neural network or other machine learning architecture) unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence based on probabilities. A language model can contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any machine learning-based language model, including language models based on other neural network architectures, such as RNN-based language models.

Entity Uncertainty Assessment

The disclosed technology provides a system and method for assessing uncertainty associated with entities through a hybrid approach combining generative models and rule-based models. The system can receive a plurality of artifacts relating to an entity and retrieve categories for assessing uncertainty levels. For each category, a generative model can extract relevant data points from the artifacts and standardize them according to defined criteria. These standardized data points can then be input into a rule-based model that applies specific rules to generate a rating for the category. The rating and standardized data points can be subsequently fed back into the generative model, which can generate a structured assessment summarizing the findings.

In some implementations, the uncertainty assessment system can utilize different generative models for different tasks based on accuracy and performance requirements. For example, a larger, more complex generative model can be used for tasks requiring higher accuracy or more nuanced understanding, while a smaller, faster model can be employed for simpler extraction tasks where speed is prioritized. This approach allows for optimization of both accuracy and computational efficiency across different stages of the assessment process. By combining generative models with rule-based systems, the disclosed technology can leverage the strengths of both approaches. The generative models can provide flexibility in handling diverse and unstructured input data, while the rule-based systems can ensure consistency and interpretability in the assessment process. This hybrid approach can enable organizations to make informed decisions based on well-documented uncertainty assessments with full traceability and explainability.

Routing techniques relating to generative models are described in U.S. patent application Ser. No. 18/954,389, filed Nov. 20, 2024, entitled "DYNAMIC SYSTEM RESOURCE-SENSITIVE MODEL SOFTWARE AND HARDWARE SELECTION," which is a continuation of U.S. patent application Ser. No. 18/812,913, filed Aug. 22, 2024, entitled "DYNAMIC SYSTEM RESOURCE-SENSITIVE MODEL SOFTWARE AND HARDWARE SELECTION," both of which are hereby incorporated by reference. For example, a system can determine an attribute associated with the prompt (e.g., that the prompt is requesting the generation of a code sample) and reroute the prompt to a model that is configured to generate software-related outputs. By doing so, the system can recommend models that are well-suited to the user's requested task, thereby improving the utility of the disclosed data generation platform. The system can become more cost-effective by selecting models that more efficiently use resources and lower expenses.

In particular, the uncertainty assessment system can receive a plurality of artifacts relating to an entity. In some implementations, an entity can be any organization or company that requires uncertainty assessment, such as a business, a corporation, or other organization. The artifacts can include annual reports, strategic plans, operational documents, policy manuals, regulatory filings, marketing materials, and other documents associated with the entity. For example, when assessing an organization, the uncertainty assessment system can receive the organization's mission statement, annual reports for the past three years, and operational guidelines. The documents can contain information describing the entity's strategic approach (e.g., growth-oriented, stability-focused, or innovation-driven approaches), risk profile (e.g., conservative, moderate, or progressive risk tolerance), organizational structure (e.g., corporate hierarchy, governance framework, or ownership structure), operational objectives (e.g., market expansion, service improvement, or resource optimization), historical performance data, budget allocations, and other relevant details that contribute to understanding the entity's operations and potential uncertainties.

Figure 3:
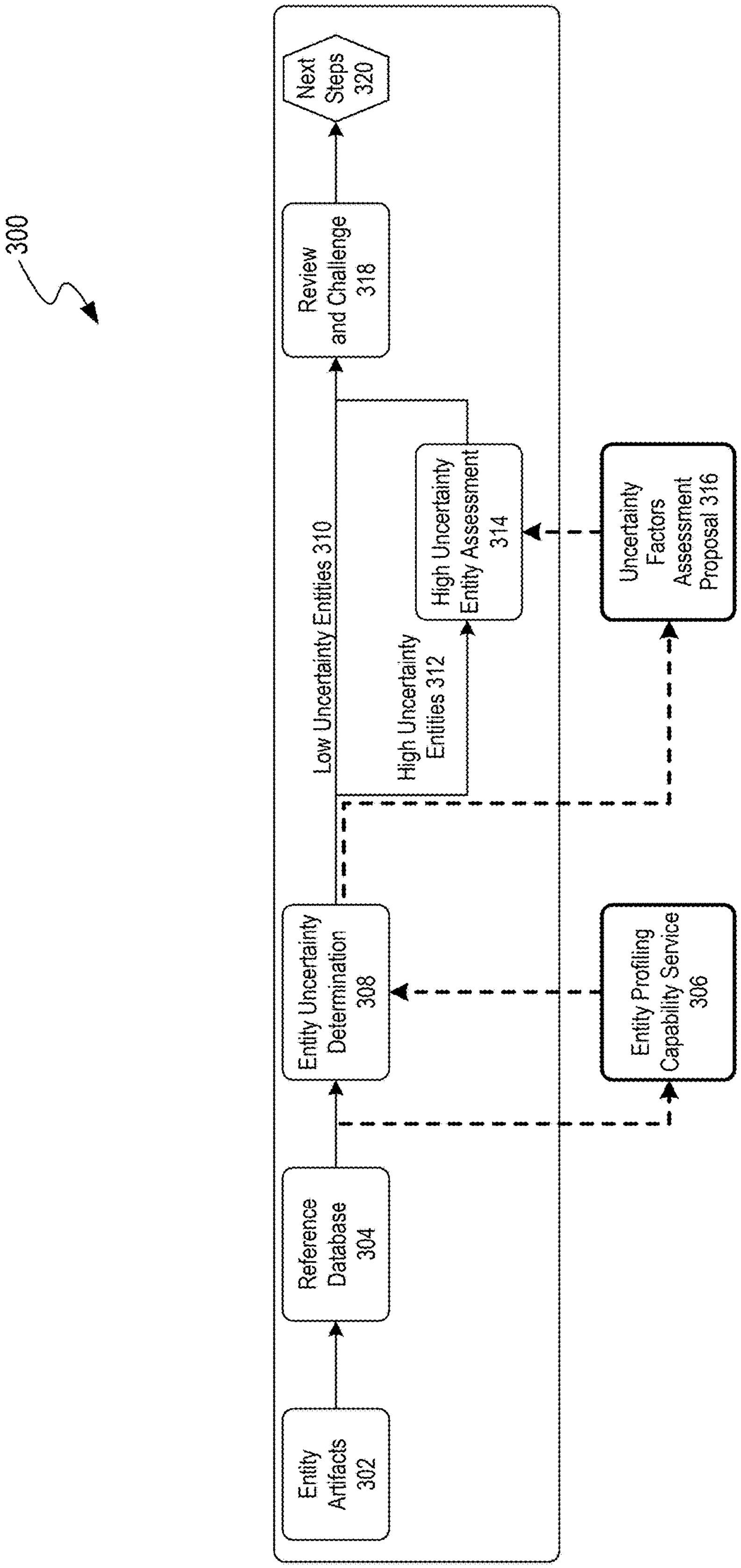
FIG. 3 illustrates a block diagram for analyzing entity uncertainty, in accordance with one or more implementations of this disclosure.

FIG. 3 illustrates a block diagram 300 for analyzing entity uncertainty, in accordance with one or more implementations of this disclosure. As shown in FIG. 3, the block diagram 300 includes multiple interconnected components arranged in a workflow. The block diagram 300 includes an entity artifacts component 302 that provides input documents to a reference database 304. The entity artifacts component 302 represents the collection of documents and data sources related to the entity being assessed. These artifacts can be stored in the reference database 304, which serves as a centralized repository for all entity-related information. The entity uncertainty determination component 308 can include the core processing unit that analyzes the artifacts to determine the entity's uncertainty level. It works in conjunction with the entity profiling capability service 306, which provides specialized analysis capabilities to extract and organize entity information according to predefined criteria. The entity uncertainty determination component 308 can employ sophisticated algorithms to evaluate multiple uncertainty factors across different categories, such as operational complexity, leverage, volatility, and uncertainty of profile. It can process both structured and unstructured data from the reference database 304 to generate comprehensive uncertainty assessments. The entity profiling capability service 306 provides specialized analysis capabilities to extract and organize entity information according to predefined criteria, including regulatory environment details, legal structure information, investment objectives, and strategies.

The uncertainty assessment system can process the received artifacts using NLP techniques to identify and extract the information relevant to each category and its associated queries. In some implementations, NLP techniques include computational techniques that enable computers to understand, interpret, and generate human language. The extraction process can involve analyzing both structured data (information organized in a predefined format, such as tables or standardized reports) and unstructured data (information without a predefined format, such as narrative text) within the documents to gather a comprehensive set of data points for assessment. For example, when processing an organization's annual report, the uncertainty assessment system can use named entity recognition to identify specific operational metrics, sentiment analysis to evaluate risk disclosures, and relationship extraction to understand connections between strategic initiatives and potential challenges. The uncertainty assessment system can extract data points such as, "The organization maintains a resource utilization ratio not exceeding 80% of total capacity," "Technology implementations are used primarily for efficiency improvements rather than experimental purposes," or "The organization allocates at least 15% of resources to contingency planning." These extracted data points provide the factual foundation for the subsequent uncertainty assessment, enabling the uncertainty assessment system to make evidence-based evaluations rather than relying on assumptions or generalizations.

In some implementations, the uncertainty assessment system can employ different approaches for processing various types of artifacts. In some implementations, approaches include different methodologies, algorithms, or processing techniques tailored to specific document types, while standardizing involves transforming diverse data into a consistent format that can be processed by rule-based systems. For example, the uncertainty assessment system can use specialized algorithms for parsing operational reports, such as table extraction techniques to identify and extract structured data from performance metrics, resource allocations, and operational statistics. These specialized algorithms can employ optical character recognition (OCR) for scanned documents, followed by table structure recognition to identify rows, columns, and their relationships. Simultaneously, the uncertainty assessment system can employ more general text analysis techniques for narrative sections of strategic plans or policy documents, such as semantic analysis to understand the meaning and context of risk disclosures, or coreference resolution to track entities mentioned across multiple paragraphs. For example, when processing an annual report, the uncertainty assessment system can use data parsing algorithms to extract precise numerical data from the operational tables while using natural language understanding techniques to analyze the leadership commentary section for qualitative risk factors. This multifaceted approach enables the uncertainty assessment system to effectively process the diverse document types typically associated with organizations, ensuring comprehensive data extraction regardless of how the information is presented.

In some implementations, the uncertainty assessment system retrieves a plurality of categories for assessing a level of uncertainty associated with the entity. In some implementations, categories include distinct classification groups used to organize and evaluate different aspects of uncertainty, while level of uncertainty indicates the degree or magnitude of unpredictability or risk associated with the entity. These categories can correspond to different types of uncertainty factors that are relevant to evaluating the entity's overall uncertainty profile. For example, the categories can include complexity of structure, leverage of the entity, volatility of the entity profile, diversification, or other factors. Each category can represent a specific aspect of the entity's operations or characteristics that contributes to its overall uncertainty level.

The categories used for assessment can be predefined based on industry standards, regulatory requirements, or organizational policies. Industry standards can include risk classification frameworks established by industry associations or rating agencies, while regulatory requirements can encompass risk assessment categories mandated by governmental bodies. Organizational policies can include proprietary risk assessment frameworks developed by organizations based on their specific risk management philosophies and business objectives. For example, an organization can use categories defined in a standard framework for assessing operational risks, including process efficiency, resource management, leadership capability, innovation capacity, adaptability, and sensitivity to market changes. In some cases, the uncertainty assessment system can dynamically adjust or expand the set of categories based on the specific type of entity being evaluated or emerging risk factors in the industry. For example, when assessing a technology-focused organization, the uncertainty assessment system can add specialized categories related to technological obsolescence, data security risks, or intellectual property protection that wouldn't be relevant for traditional service organizations. This adaptive approach ensures that the assessment remains relevant and comprehensive as new types of entities and risk factors emerge in the business landscape.

Each category can be associated with queries designed to extract relevant information from the received artifacts. In some implementations, queries include specific questions or information requests formulated to identify and extract particular data points from the artifacts. These queries can be structured to target specific data points, phrases, or sections within the documents that are pertinent to assessing the uncertainty level for that particular category. For example, queries related to a complexity category can seek information on structural metrics (such as organizational hierarchy levels), operational intricacy (degree of interdependence between business processes), decision-making frameworks (complexity of approval chains and governance structures), integration challenges (difficulties in coordinating across functional areas), or procedural density (number and sophistication of operational procedures). In a practical implementation, when assessing an organization, the uncertainty assessment system can generate queries such as, "What is the maximum number of approval layers specified in the governance documentation?" "Are there any restrictions on cross-functional decision-making processes?" and "What simplification initiatives are documented for reducing operational complexity?" These structured queries enable the uncertainty assessment system to systematically gather the specific information needed to evaluate each uncertainty category, ensuring a comprehensive and consistent assessment approach across different entities.

The uncertainty assessment system can benefit from retrieving data about the entity alongside a structured framework for evaluation based on the categories. When the system processes information such as strategic initiatives, operational controls, and resource allocation together with evaluation frameworks for resource utilization, adaptability, and operational risks, it produces more accurate and contextual assessments. For example, analyzing an organization's operational manual, annual reports, and production capacity documentation through the lens of categories like supply chain resilience, production efficiency, quality control measures, and market demand stability enhances the depth and relevance of the analysis. This approach allows the uncertainty assessment system to effectively extract relevant data points, standardize them according to predefined criteria, input them into rule-based models, and generate comprehensive uncertainty assessments.

In some implementations, the uncertainty assessment system can employ a generative model to retrieve and standardize the data points from artifacts for each category. Generative models, which include technologies such as large language models (LLMs), transformer-based architectures, and other neural network systems, can process and understand complex textual information across multiple document types. In some implementations, the uncertainty assessment system specifically inputs data into a node of an LLM. A node can be a specific computational unit or processing element within the neural network architecture of the LLM. For example, when inputting the plurality of documents and a specific category into the LLM, the system can target a particular attention head or transformer block that has been identified as especially effective for information extraction tasks. This targeted approach can improve processing efficiency and output quality by leveraging the specialized capabilities of different components within the neural network architecture. For example, earlier nodes in the network can be better suited for basic pattern recognition and entity identification, while deeper nodes can excel at contextual understanding and relationship inference. By directing inputs to specific nodes, the system can optimize the extraction and standardization process for different types of information and different assessment categories. This node-specific approach also enables more granular monitoring and control of the LLM's processing, allowing the system to track how information propagates through the network and identify potential sources of error or uncertainty in the model's outputs.

For each category, the uncertainty assessment system inputs the received artifacts and the specific category into the generative model. The artifacts can include diverse document types such as operational manuals, strategic plans, governance documents, and technical specifications, each containing different formats and information structures. The generative model processes these varied inputs and identifies a plurality of data points relating to the category, then standardizes these data points according to predefined criteria. For example, when processing documents related to a manufacturing entity, the system can extract information about production capacity, equipment maintenance schedules, quality control processes, and supply chain dependencies. The standardization process transforms these diverse data elements into a consistent format with normalized values, standardized terminology, and structured relationships that can be readily ingested by deterministic models in subsequent processing steps. This transformation is crucial for enabling rule-based systems to operate effectively on information that was originally presented in varied and unstructured formats across multiple documents.

The retrieval process can involve the uncertainty assessment system prompting the generative model to retrieve an initial set of data points related to an initial query for a given category. The system can generate prompts that guide the generative model to focus on specific aspects of the category while maintaining awareness of the broader context. For example, when assessing the resource utilization category for a healthcare organization, the initial query can be, "What is the entity's current resource utilization rate across different operational departments?" The generative model analyzes the input artifacts-which can include staffing reports, facility usage statistics, equipment inventories, and departmental budgets-to extract relevant information and generate an initial set of data points in response to this query. These data points can include information such as, "The radiology department operates at 78% capacity during standard hours and 45% during off-hours," "The emergency department experiences resource utilization peaks of 95% during weekend evenings," and "Administrative staff allocation is maintained at 65% of recommended levels across all departments." The generative model can identify these data points even when they appear in different formats and contexts throughout the artifacts.

Based on the initial data points retrieved, the uncertainty assessment system determines subsequent queries through an adaptive, context-aware process. These subsequent queries can be designed to delve deeper into specific aspects of the category or to address any gaps in the information obtained from the initial query. The system can employ sophisticated query generation algorithms that analyze the completeness, consistency, and depth of the initial data points to identify areas requiring further exploration. For example, if the initial query about resource utilization for a manufacturing entity yielded information about current production line utilization rates, a subsequent query can be, "What are the entity's policies and technical capabilities for managing peak production demand across different product lines?" This adaptive query approach enables the system to build a comprehensive understanding of the entity's uncertainty profile through iterative information gathering. Additional follow-up queries can include, "What contingency measures exist for resource shortages in critical production areas?" or "How does seasonal variation affect resource allocation across different manufacturing facilities?" Each query builds upon previous information to create a more complete and nuanced assessment of the entity's uncertainty profile.

The uncertainty assessment system then prompts the generative model to retrieve subsequent data points related to these follow-up queries. This iterative process allows for a more comprehensive and nuanced extraction of relevant information from the artifacts. For example, when assessing a technology company's operational stability, the system can first gather information about current system uptime metrics, then follow up with queries about redundancy systems, disaster recovery protocols, and historical incident response times. Each iteration adds layers of detail and context to the assessment, enabling a more thorough understanding of the entity's uncertainty profile. The system can conduct multiple rounds of queries, with each round becoming more specific and targeted based on previously gathered information. This approach resembles the way human experts would investigate a complex topic, starting with broad questions and progressively focusing on specific details and potential areas of concern as their understanding deepens.

In some implementations, the generative model can standardize both the initial and subsequent data points according to the specified criteria and transformation procedures. This comprehensive standardization process involves various sophisticated operations such as normalizing numerical values across different measurement systems, categorizing qualitative information according to predefined classification frameworks, resolving terminology inconsistencies, and formatting text-based data into structured fields with defined relationships. For example, when standardizing data for a manufacturing entity's resource utilization assessment, the system can transform statements like "Factory A typically runs at around three-quarters capacity during weekdays" and "Factory B operates at approximately 80% of maximum output" into standardized data points such as "Factory A Utilization: 75% (Weekday Average)" and "Factory B Utilization: 80% (Timeframe Unspecified)." Similarly, qualitative descriptions of maintenance procedures can be categorized according to a standardized framework that classifies them as preventative, predictive, reactive, or condition-based maintenance approaches. The system can also standardize temporal information, converting various date and time formats into a consistent representation and resolving relative time references (such as "last quarter" or "the previous fiscal year") into absolute time periods. The result is a set of standardized data points that are consistent across different artifacts and categories, facilitating more accurate and comparable assessments in subsequent processing steps. This standardization is crucial for enabling deterministic rule-based systems to process information that was originally presented in diverse and unstructured formats.

The standardization process can be particularly important when dealing with complex organizational structures or multifaceted entities that contain nested or overlapping operational units. For example, when processing documents related to a multi-division manufacturing organization, the uncertainty assessment system can be designed to identify and handle overlapping information that applies to multiple divisions while also recognizing division-specific details. This capability is essential for accurately representing the complex relationships and dependencies within multifaceted organizations. The system can employ entity recognition techniques to identify when the same resource, process, or policy is referenced across different documents and contexts, ensuring that these connections are preserved in the standardized data.

To ensure consistency and relevance in the extracted data, the uncertainty assessment system can input a first prompt to the generative model with specific instructions for data transformation procedures. These detailed instructions guide the generative model in how to process and format the extracted information according to standardized protocols. The prompts can contain complex, multistep instructions that define how different types of information should be handled. For example, when assessing a manufacturing entity's operational complexity, the prompt can instruct the generative model to "Convert all production capacity values to standardized units per hour; categorize all process descriptions according to the five-level complexity scale defined in the entity's operational manual; standardize all equipment references using the universal equipment classification system; normalize all time-based metrics to a 24-hour operational cycle; and classify all operational dependencies according to the criticality framework outlined in section 3.2 of the entity's risk management guidelines." These detailed transformation instructions ensure that the extracted data is processed consistently regardless of how it was originally presented in the source documents. The system can also include instructions for handling ambiguous or conflicting information, such as, "When encountering conflicting production capacity values, prioritize the most recent document and flag the discrepancy for human review."

The standardization process can be specifically designed to ensure that the resulting data points are ingestible by deterministic models. This characteristic is crucial because deterministic models, unlike probabilistic or neural network-based approaches, operate according to fixed, predefined rules and require inputs in highly specific formats to function correctly. To be ingestible by deterministic models, the standardized data points can be required to have consistent data types and formats that align with the input requirements of the rule-based system. For example, numerical values can be required to be normalized to specific units of measurement and precision levels, while categorical data must conform to predefined classification schemes with no ambiguous or intermediate values. Second, the data points can be required to have clear semantic definitions that map directly to the variables and parameters used in the deterministic model's rule set. This semantic alignment ensures that the rule-based system correctly interprets and processes each data point according to its intended meaning. Third, the standardized data can be required to maintain appropriate relationships and dependencies between different data points, preserving the logical structure needed for rule evaluation. For example, if certain rules depend on comparing values across different operational areas or time periods, the standardized data must maintain these relational structures. Fourth, the data points can be required to be complete for all required fields, with appropriate handling of missing or uncertain values according to the deterministic model's processing requirements. This can involve substituting default values, applying confidence indicators, or implementing specific missing-value handling rules. By ensuring these characteristics, the standardization process creates a bridge between the flexible, context-aware capabilities of generative models and the precise, rule-driven operation of deterministic systems, enabling the hybrid approach that combines the strengths of both methodologies.

In some implementations, the uncertainty assessment system incorporates organization-specific knowledge and definitions into prompts provided to the generative model. This contextual enrichment ensures that the generative model interprets and categorizes information in a manner consistent with the organization's internal standards, terminology, and operational frameworks. The system can maintain a knowledge base of organization-specific definitions, classification systems, and evaluation criteria that are incorporated into the prompts. For example, if a manufacturing organization has a specific definition of what constitutes a "high-reliability production process" that differs from industry standards, this definition can be incorporated into the prompt, allowing the generative model to accurately classify extracted information according to the organization's own assessment framework. Similarly, if the organization uses a proprietary classification system for categorizing operational incidents or quality issues, these classifications can be included in the prompts to ensure consistent categorization. For a healthcare entity, the system can incorporate organization-specific definitions of patient care quality metrics, resource allocation priorities, or clinical risk factors that have been developed based on the organization's unique patient population and service model. This approach ensures that the assessment reflects the organization's own understanding of its operations and risk landscape rather than imposing external frameworks that do not align with its specific context.

By employing this comprehensive approach to data retrieval and standardization, the uncertainty assessment system ensures that the information extracted from diverse artifacts is comprehensive, relevant, and formatted consistently for further analysis. The system combines the semantic understanding capabilities of generative models with structured data processing techniques to transform unstructured document content into standardized, analyzable data points. This process forms a foundation for subsequent stages of uncertainty assessment, enabling more accurate and reliable evaluations of entity-related risks and uncertainties. The standardized data can serve as the input for rule-based systems that apply deterministic logic to generate consistent and explainable uncertainty ratings, creating a hybrid approach that leverages the strengths of both generative AI and traditional rule-based systems.

Figure 4:
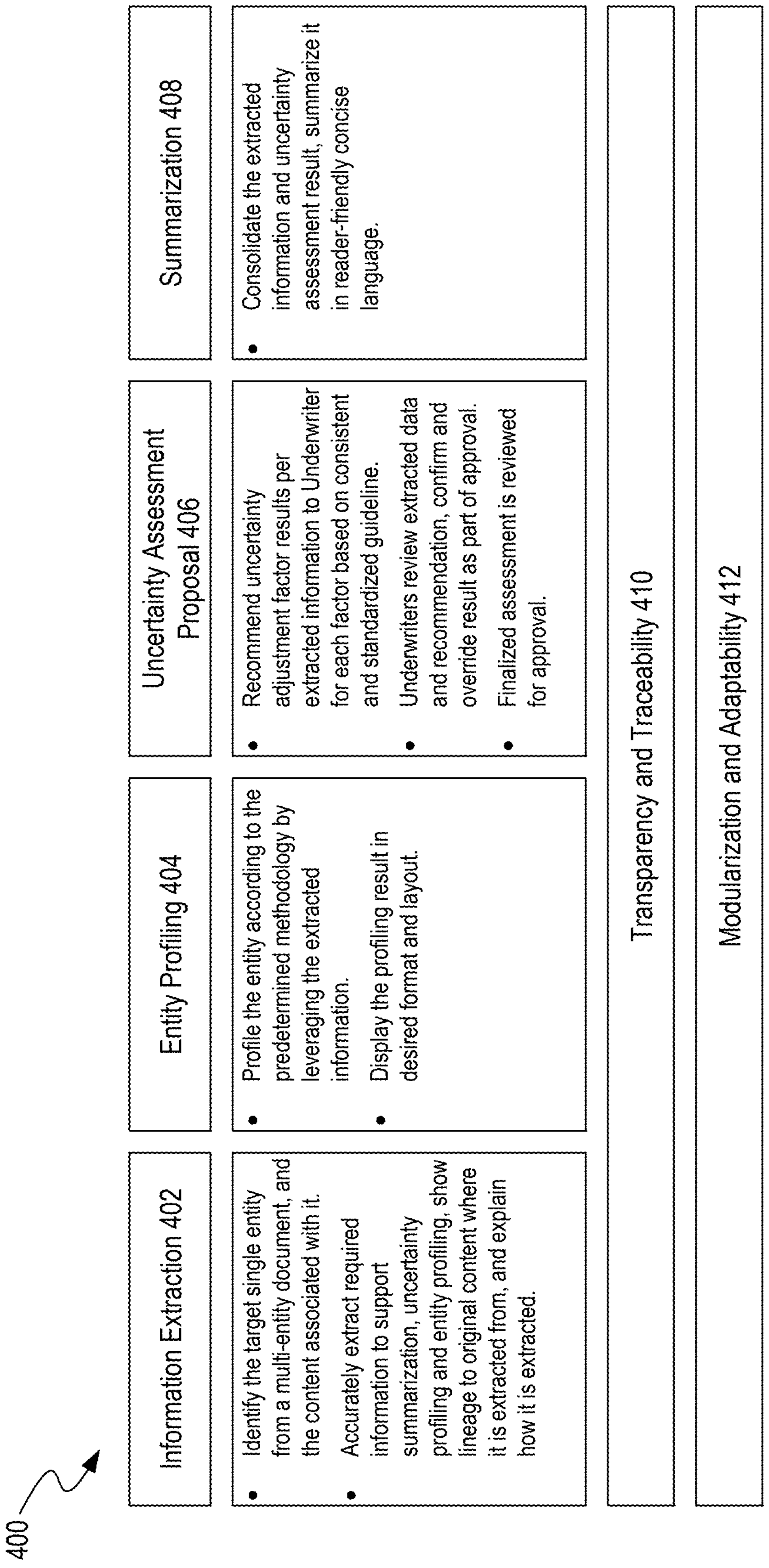
FIG. 4 illustrates a block diagram for analyzing entity uncertainty, in accordance with one or more implementations of this disclosure.

FIG. 4 illustrates a block diagram 400 for analyzing entity uncertainty, in accordance with one or more implementations of this disclosure. As shown in FIG. 4, the block diagram 400 includes multiple functional components arranged in a workflow. The system includes an information extraction component 402 that identifies target entities from multi-entity documents and extracts required information to support summarization, uncertainty profiling, and entity profiling. The information extraction component 402 accurately extracts required information while maintaining lineage to the original content where it is extracted from and explaining how it is extracted. An entity profiling component 404 processes the extracted information according to predetermined methodologies and displays profiling results in desired formats and layouts. The entity profiling component 404 profiles the entity according to predetermined methodology by leveraging the extracted information and displays the profiling result in the desired format and layout.

Figure 5:
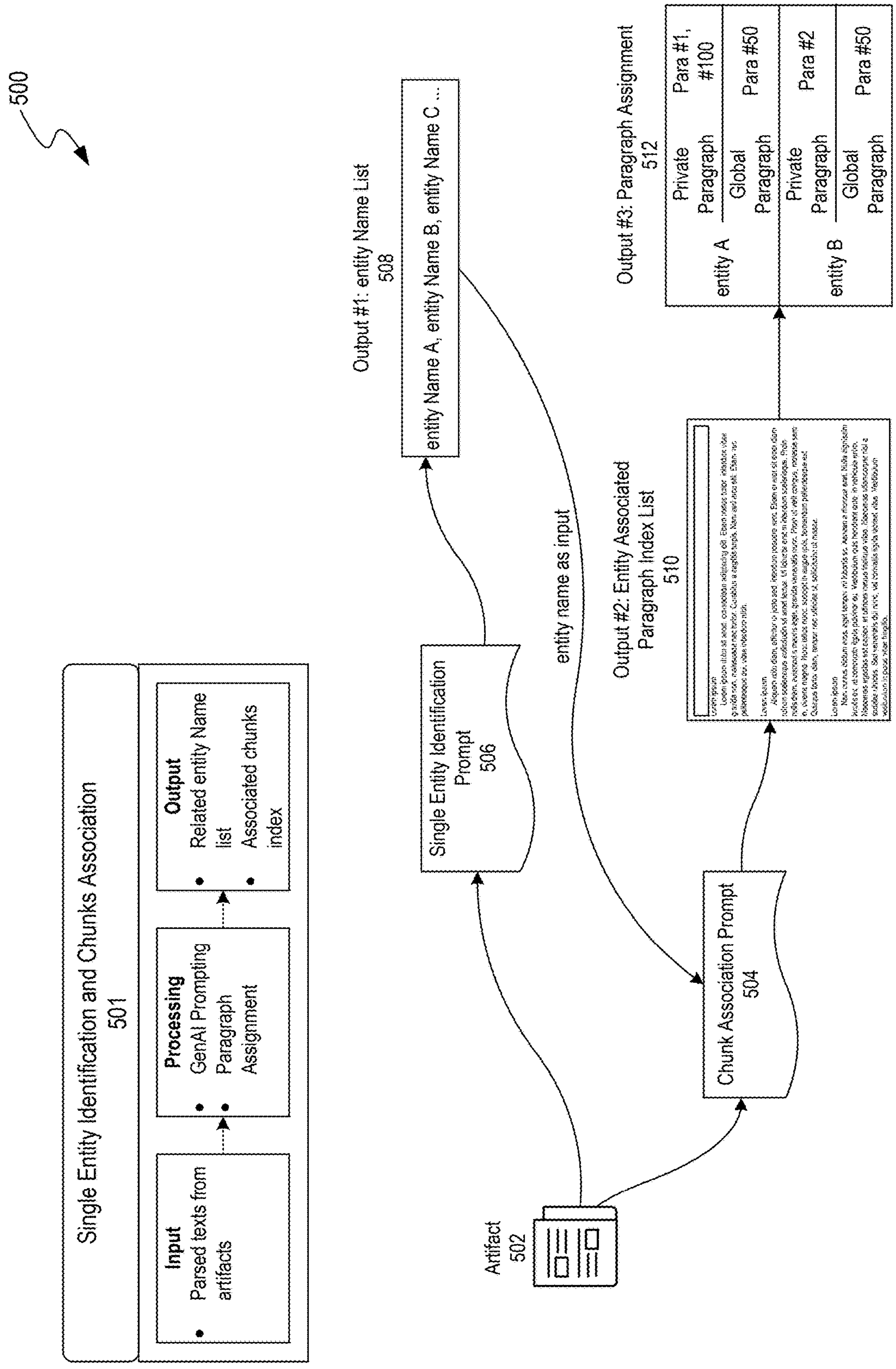
FIG. 5 illustrates a block diagram for analyzing entity uncertainty, in accordance with one or more implementations of this disclosure.

FIG. 5 illustrates a block diagram 500 for analyzing entity uncertainty, in accordance with one or more implementations of this disclosure. As shown in FIG. 5, the block diagram 500 includes a component single entity identification and chunks association 501, which contains three subcomponents arranged in sequence: input, processing, and output. The input component receives parsed texts from artifacts. The processing component performs generative prompting and paragraph assignment operations on the input data. The output component produces a related entity name list and associated chunks index. For example, the output component can generate a list of entity names that have been identified within the parsed text, along with a chunks index. A chunks index can serve as a reference system that maps each identified entity to specific segments, or "chunks," of the original text where the entity appears. This index can enable efficient retrieval and analysis of relevant text portions, as it can indicate the exact locations or boundaries of the text segments associated with each entity. By using a chunks index, downstream processes can quickly access, review, or further analyze the contextual information surrounding each entity, which can enhance the overall accuracy and utility of entity uncertainty analysis.

The diagram further shows an artifact component 502 that feeds into two separate processing paths. This system identifies whether a given artifact is a single entity or multi-entity artifact. A single entity artifact relates only to a single entity. The first path from the artifact component 502 connects to a single entity identification prompt component 506, which outputs entity names (Entity Name A, Entity Name B, Entity Name C) as Output #1: entity name list 508. These entity names can identify the entities to which single entity artifacts relate. If a given artifact is a multi-entity artifact, the system uses a generative model to identify associated chunks of text within the artifact that relate to each entity. The second path from the artifact component 502 connects to a chunk association prompt component 504. The entity name list 508 feeds back into the system as entity name input to the chunk association prompt 504. The chunk association prompt 504 produces Output #2: an entity associated paragraph index list 510, which flows into a paragraph assignment component 512 that uses generative models, such as LLMs, to generate Output #3: paragraph assignment 512. The paragraph assignment component 512 displays a structured organization of entities and their associated paragraphs.

The system can distinguish between private paragraphs and global paragraphs when assigning paragraph indices to entities. Private paragraphs can refer to text segments that are uniquely associated with a specific entity, meaning the content in these paragraphs pertains exclusively to that entity and is not shared with others. In contrast, global paragraphs can represent text segments that are relevant to multiple entities, containing information that applies broadly or is shared among several entities. The system maintains the index for both private paragraphs and global paragraphs, with specific paragraph numbers assigned to each category. For example, Entity A includes Private Paragraph Parameter generation system #1, #100 and Global Paragraph Para #50, while Entity B includes Private Paragraph Para #2 and Global Paragraph Para #50. In some implementations, the Output #3 can represent data points (e.g., standardized or unstandardized) retrieved by the generative model.

The uncertainty assessment system can input the standardized plurality of data points into a rule-based model to generate a rating for each category. As previously discussed, the data point retrieval process can involve retrieving both initial and subsequent data points relating to both initial and subsequent queries. In some implementations, the uncertainty assessment system can input both the standardized initial data points and the standardized subsequent data points into the rule-based model. The rule-based model can apply predefined rules, multilayered criteria or complex evaluation algorithms to analyze the standardized data and produce a comprehensive quantitative or qualitative assessment of uncertainty for the specific category. The rule-based model can function as a deterministic engine that processes the standardized data according to predefined logical frameworks, ensuring consistent and explainable outcomes across different assessments. For example, when evaluating a healthcare organization's operational resilience, the rule-based model can apply different sets of criteria to various aspects of the organization's operations, such as patient care protocols, facility management procedures, and emergency response capabilities, before synthesizing these individual assessments into an overall category rating.

In some implementations, the rule-based model can apply a set of logical conditions, multitiered thresholds, and contextual modifiers to analyze the standardized data points with exceptional granularity. For example, when assessing the operational stability category for a manufacturing entity, the rule-based model can evaluate numerous interconnected factors such as production consistency across different product lines, equipment reliability under varying operational conditions, preventative maintenance effectiveness, and multitier supply chain resilience. The model can apply nuanced rules such as, "If production variance exceeds 15% over a 3-month period while seasonal demand fluctuations remain below 10%, increase the uncertainty rating by one level" or "If equipment downtime is less than 2% of operational hours and preventative maintenance compliance exceeds 95%, decrease the uncertainty rating by one level." For a healthcare organization, the rules can include, "If patient-to-staff ratios exceed recommended guidelines by more than 20% during peak hours while patient satisfaction scores remain above 85%, maintain the current uncertainty rating" or "If medication error rates have decreased by at least 30% over the past year while implementing new electronic health record systems, decrease the uncertainty rating by one level." These complex rule structures allow the system to account for the multifaceted nature of operational environments and their impact on uncertainty levels.

The rule-based model can incorporate sophisticated multibranch decision trees, hierarchical weighted scoring systems, and conditional evaluation pathways to account for the relative importance and interdependencies of different factors within each category. For example, in evaluating the resource utilization category for a manufacturing entity, the model can implement a hierarchical weighting system that assigns primary weights to critical production resources (such as specialized manufacturing equipment or proprietary production technologies), secondary weights to essential supporting resources (such as quality control systems or maintenance capabilities), and tertiary weights to auxiliary resources (such as administrative support systems or non-critical supplies). This multitiered weighted approach allows for a more nuanced and contextually appropriate assessment that accurately reflects the entity's specific operational priorities, strategic objectives, and risk profile. Similarly, for a technology company, the model can assign higher weights to core intellectual property and key technical talent in the resource utilization category, while for a logistics company, the weighting system can prioritize distribution network capacity and transportation assets. The decision trees can include multiple conditional branches that adapt the evaluation process based on entity-specific characteristics, such as size, industry sector, operational maturity, or geographic distribution, ensuring that the assessment methodology is appropriately calibrated to the entity's particular circumstances.

The rule-based model can also incorporate sophisticated conditional logic and adaptive assessment pathways to handle cases where certain data points are missing, incomplete, ambiguous, or inconclusive. This capability is particularly important when dealing with complex entities that operate across multiple jurisdictions, business lines, or operational environments where information availability can vary significantly. For example, if information about a specific operational metric, such as equipment utilization efficiency, is unavailable for certain production facilities, the model can dynamically adjust its assessment methodology to rely more heavily on related metrics, such as output consistency, production scheduling adherence, or maintenance frequency. The system can implement fallback assessment pathways that activate when primary data points are unavailable, ensuring assessment continuity and completeness. For a global organization with operations in regions with different reporting requirements, the model can encounter varying levels of detail in operational data across different locations. In such cases, it can apply region-specific assessment rules that account for these differences in data granularity. Additionally, the model can incorporate confidence weighting for different data points based on their completeness, recency, and reliability, giving greater influence to high-confidence data in the final assessment. This adaptive approach allows the system to generate meaningful, consistent, and comparable ratings even when faced with incomplete, inconsistent, or heterogeneous datasets, which is often the reality when assessing complex organizations with diverse operations and reporting practices.

In some implementations, the rule-based model generates ratings on a predefined scale that captures both the magnitude and the nature of uncertainty. These scales can range from simple numeric systems (such as a 1-5 or 1-10 scale) to more complex qualitative frameworks with descriptive categories (such as "Very Low Uncertainty," "Low Uncertainty," "Moderate Uncertainty," "High Uncertainty," and "Very High Uncertainty"). The specific rating scale can be meticulously tailored to the organization's assessment framework, strategic objectives, operational context, and reporting requirements. For example, a manufacturing organization can implement a detailed 7-point scale for operational categories that includes specific descriptors for each level, such as "Level 1: Highly Predictable Operations with Minimal Variability" to "Level 7: Highly Volatile Operations with Significant Unpredictability." A healthcare system can use a matrix-based rating approach that evaluates both the likelihood and impact of operational disruptions across different service lines. Some organizations can implement industry-specific rating frameworks that align with established standards or regulatory expectations in their sector. The system can also support different rating scales for different assessment categories, recognizing that the nature and implications of uncertainty can vary significantly across different aspects of an organization's operations. For example, a technology company can use a more granular 10-point scale for assessing innovation-related categories where nuanced differentiation is valuable while using a simpler 3-point scale for more standardized operational categories. This flexibility in rating scales allows organizations to implement assessment frameworks that best align with their specific decision-making processes and risk management approaches.

The output of the rule-based model—the comprehensive rating for each category—serves as a standardized, consistent, and comparable measure of uncertainty that can be used for multifaceted analysis and strategic decision-making across the organization. These ratings provide a systematic basis for comparing uncertainty levels across different aspects of the entity's operations, business units, geographic locations, and time periods. For example, a global manufacturing organization can use these ratings to compare operational stability across different production facilities, identifying locations with higher uncertainty for targeted improvement initiatives. A healthcare system can compare uncertainty ratings across different service lines to prioritize resource allocation and process improvement efforts. The ratings can also be tracked over time to identify trends and evaluate the effectiveness of uncertainty reduction initiatives. Beyond internal comparisons, these standardized ratings can facilitate benchmarking against industry peers or established best practices when such comparative data is available. The ratings can be integrated into various organizational decision-making processes, including strategic planning, capital allocation, operational improvement, and risk mitigation efforts. For example, business units with higher uncertainty ratings in key operational categories can receive additional oversight, support resources, or improvement mandates. Similarly, proposed initiatives that would significantly reduce uncertainty in critical categories can receive prioritization in resource allocation decisions. By providing a consistent framework for evaluating and communicating uncertainty, these ratings enable more informed, transparent, and defensible decision-making throughout the organization.

By using a sophisticated rule-based model to generate ratings, the uncertainty assessment system ensures consistency, transparency, explainability, and defensibility in the assessment process. The predefined rules, criteria, thresholds, and evaluation methodologies provide a comprehensive audit trail that documents every aspect of the assessment process, allowing stakeholders to understand precisely how ratings were derived and facilitating detailed explanations to oversight bodies, governance committees, or other interested parties. The rule-based approach also ensures consistency across different assessments, regardless of who conducts them or when they occur, eliminating the subjectivity and variability that often characterize manual assessment processes. For a global organization with operations in multiple regions, this consistency is essential for meaningful comparison and aggregation of uncertainty assessments across the enterprise. The deterministic nature of the rule-based model also provides predictability in the assessment process—given the same inputs, the system will always produce the same outputs, which builds confidence in the assessment methodology and results. This approach combines the flexibility and semantic understanding capabilities of the generative model in handling diverse, unstructured input data with the rigorous, consistent, and explainable nature of rule-based systems, creating a robust and defensible framework for uncertainty assessment that meets both operational and governance requirements.

Returning to FIG. 3, entities can be classified into low uncertainty entities 310 and high uncertainty entities 312 through separate processing paths. Low uncertainty entities 310 flow directly to a review and challenge component 318, while high uncertainty entities 312 undergo additional processing through a high uncertainty entity assessment component 314. The high uncertainty entity assessment component 314 receives input from an uncertainty factors assessment proposal component 316, which also interfaces with the entity profiling capability service 306. The review and challenge component 318 evaluates the processed entities and their associated uncertainty assessments. After review, the entities proceed to the next steps component 320 for further processing or action. The uncertainty factors assessment proposal component 316 can be activated once an entity is determined to be high uncertainty. This component helps extract narratives associated with each risk adjustment factor and provides a proposed uncertainty assessment for the underwriter to review, confirm, and if necessary, override. The component displays different document chunks that support specific outcomes and supports iterative document ingestion to provide updated assessments with a full audit trail.

The uncertainty assessment system can input the rating and standardized data points into the generative model to generate a structured assessment. This process can involve using the outputs from the rule-based model along with the standardized data to create a detailed, nuanced, and multifaceted evaluation of the uncertainty associated with each category. The generative model transforms the quantitative ratings and structured data points into narrative assessments that capture the complexity, context, and implications of the uncertainty profile. For example, when assessing the operational resilience of a manufacturing entity, the generative model can produce a narrative that not only states the rating but explains how various factors, such as production redundancy, supply chain diversity, and workforce flexibility, contribute to that rating. The assessment can discuss how these factors interact with each other, highlighting potential vulnerabilities where multiple factors align unfavorably or strengths where complementary capabilities reinforce each other. For a healthcare organization, the assessment can explain how patient volume variability, staffing flexibility, and facility utilization patterns collectively influence operational uncertainty, providing context that helps stakeholders understand not just the rating itself but the underlying dynamics that drive it. This transformation from structured data to contextual narrative leverages the generative model's sophisticated language capabilities to communicate complex uncertainty profiles in a format that is accessible and actionable for diverse stakeholders across the organization.

In some implementations, the uncertainty assessment system can input a detailed, multi-component second prompt into the generative model with instructions for summarizing procedures. These sophisticated instructions can guide the generative model in how to structure, format, prioritize, contextualize, and present the assessment information, ensuring consistency, relevance, and usability across different categories and entities. For example, the prompt can specify a comprehensive template for the assessment that includes sections for an executive summary highlighting key findings and implications, detailed analysis of primary and secondary uncertainty factors, supporting evidence with specific data points and trends, comparative context that places the assessment in relation to historical performance or peer benchmarks, and actionable recommendations prioritized by potential impact and implementation feasibility. The prompt can include specific guidance on how to balance technical detail with strategic implications, ensuring that the assessment is accessible to diverse stakeholders while still providing sufficient depth for technical specialists. For a manufacturing entity assessment, the prompt can instruct the generative model to emphasize operational interdependencies and supply chain considerations, while for a service organization, it can prioritize workforce flexibility and customer demand patterns. The prompt can also include instructions on how to handle potentially sensitive information, ensuring appropriate treatment of confidential data or competitive insights. Additionally, the prompt can specify how to incorporate visual elements or structured data presentations within the narrative assessment, such as summary tables, rating scales, or trend indicators that enhance comprehension of complex uncertainty profiles. These detailed prompting instructions ensure that the generative model produces assessments that not only accurately reflect the underlying data and ratings but present them in a format optimized for organizational decision-making processes and stakeholder needs.

Returning to FIG. 4, the components can work together in a sequential workflow to process entity documentation, extract relevant information, generate assessments and profiles, and produce summarized outputs. In particular, the uncertainty assessment component 406 can apply a consistent and standardized guideline to recommend uncertainty adjustment factor results for each relevant factor, based on extracted information. The uncertainty assessment component 406 generates recommendations, which can be presented to an underwriter for review. In some implementations, the underwriter can examine the extracted data and recommended adjustment factors, providing the capability to confirm or override the results as part of the approval process. The finalized assessment can then be reviewed, ensuring the completed assessment is reviewed and approved in accordance with organizational standards. The summarization component 408 consolidates the information into reader-friendly language. The transparency and traceability layer 410 and modularization and adaptability layer 412 span across all components, providing system-wide capabilities. The transparency and traceability layer 410 ensures that all processing steps, data transformations, and decision points are documented and traceable, creating an audit trail that explains how assessments were derived. The modularization and adaptability layer 412 enables the system to be flexible and extensible, allowing components to be updated or replaced without disrupting the entire system.

In some implementations, the assessment can include a detailed, contextually aware explanation of the rating supported by relevant data points, trend analyses, comparative benchmarks, and causal relationships from the standardized dataset. For example, when assessing the operational stability of a manufacturing entity, the assessment can include the overall stability rating followed by a detailed analysis of specific metrics and their implications, such as production consistency across different product lines and facilities (with specific variance percentages and trends), equipment reliability statistics (including mean time between failures, preventative maintenance compliance rates, and age distribution of critical equipment), supply chain resilience indicators (such as supplier diversification metrics, geographic concentration analysis, and historical disruption recovery times), workforce stability measures (including turnover rates, skill distribution, and training program effectiveness), and quality control performance (with defect rates, rework percentages, and customer return statistics). For each metric, the assessment can explain not just the current value but its historical trend, its relationship to industry benchmarks when available, and its specific contribution to the overall uncertainty rating. The assessment can note, for example, that while overall production consistency has improved by 12% over the past year, this improvement has been concentrated in established product lines, while newer products still show significant variability that contributes to elevated uncertainty in certain operational areas. This level of detail and context helps stakeholders understand not just the what of the uncertainty rating but the why, enabling more informed and targeted responses to the identified uncertainty factors.

In some implementations, the generative model can output comprehensive citations to documents corresponding to the data points used in the assessment. These detailed citations provide complete traceability and verification pathways, allowing reviewers to efficiently locate and examine the exact sources of information used in the assessment. Rather than general references to documents, these citations can include specific page numbers, section identifiers, paragraph locations, or data table references that pinpoint the exact location of the supporting information. For example, the assessment can include citations such as "Annual Operational Review (2023), Section 4.2.3, Pages 78-79, which details the production variance analysis across all manufacturing facilities" or "Strategic Technology Plan (2023-2025), Appendix B, Table 12, which outlines the planned system upgrades with implementation timelines and expected operational impacts." For digital documents, the citations can include hyperlinks that take reviewers directly to the referenced content. The system can also maintain a comprehensive citation index that aggregates all sources used across the assessment, organized by document type, recency, and relevance rating. This detailed citation approach serves multiple important purposes: it enables efficient verification of the assessment's factual foundations; it provides context for how information was interpreted and applied; it creates an audit trail for governance and oversight purposes; and it facilitates deeper investigation of specific areas of interest. For organizations operating in regulated environments or those with robust governance requirements, this citation capability is particularly valuable as it demonstrates the evidential basis for uncertainty assessments and supports defensibility of the resulting decisions. The citation system can also highlight instances where critical information was unavailable or incomplete, transparently documenting limitations in the assessment's information foundation.

The structured assessment can include a fact-based summary of the standardized data points. In particular, the generative model can produce a detailed explanation of the uncertainty rating for each category, directly referencing the relevant data points extracted and standardized from the entity's artifacts. For example, when evaluating operational complexity, the assessment can cite the number of hierarchical levels identified in governance documents, the degree of process interdependence described in operational manuals, and the frequency of cross-functional decision-making outlined in policy statements. The generative model can synthesize these data points to explain how each contributes to the assigned rating, such as noting that a high number of approval layers and complex integration challenges are primary drivers of elevated uncertainty in the complexity category. Each assertion in the summary can be supported by specific, traceable data points, with citations to the original documents, sections, or data tables from which the information was derived. This fact-based summarization can ensure that the rationale for each rating is transparent, evidence-driven, and readily auditable.

In some implementations, the structured assessment can include a comprehensive summary of the standardized data points, presented in a format that highlights their relevance, relationships, patterns, and implications for the uncertainty rating. The summarization can involve multiple analytical approaches, such as grouping related data points into logical clusters (e.g., operational metrics, workforce indicators, technology factors), identifying significant trends across multiple time periods (e.g., showing how key metrics have evolved over the past several reporting cycles), highlighting statistical outliers or anomalies that significantly impact the uncertainty assessment (e.g., noting that while most operational metrics show stability, a specific process exhibits unusual variability), and illustrating causal or correlational relationships between different factors (e.g., showing how supply chain diversification correlates with reduced production disruptions). For a healthcare organization, the data summary can group metrics related to patient volume predictability, staffing flexibility, and resource utilization, showing how these factors interact to influence operational uncertainty. The summary can include visual representations such as heat maps that show the relative contribution of different factors to the overall uncertainty rating, allowing quick identification of the most significant drivers. It can also include comparative elements that show how the current data points compare to historical values, planned targets, or industry benchmarks when available. This sophisticated data presentation transforms raw metrics into actionable insights, helping stakeholders identify the most impactful areas for uncertainty reduction efforts and understand the complex interplay of factors that create the entity's overall uncertainty profile.

By using a sophisticated generative model to create these structured assessments, the uncertainty assessment system can produce detailed and context-aware evaluations that combine quantitative ratings with qualitative analysis and strategic implications. This approach leverages the generative model's advanced capabilities in several critical dimensions: semantic understanding that captures the meaning and significance of complex data patterns; contextual awareness that recognizes how different factors relate to each other and to the broader operational environment; natural language generation that communicates complex concepts in clear, accessible prose; and adaptive focus that emphasizes different aspects of the assessment based on their relevance and significance. For example, when assessing a manufacturing entity's supply chain resilience, the generative model can recognize that a geographic concentration of suppliers represents a particularly significant uncertainty factor and provide expanded analysis of this aspect, including potential mitigation strategies and implementation considerations. For a technology company, the model can emphasize how rapid innovation cycles create both opportunities and uncertainties, exploring the tension between technological advancement and operational stability. The generative model can also adapt its communication style and technical depth based on the intended audience, producing executive summaries that focus on strategic implications alongside detailed technical appendices that provide in-depth analysis for specialists. This flexibility allows the same underlying assessment to serve multiple stakeholder needs without requiring separate manual preparations. Throughout this process, the generative model adheres to the consistent structure defined by the organization's assessment framework, ensuring that despite this adaptive content approach, all assessments maintain a consistent organization that facilitates comparison and aggregation across different categories and entities.

The uncertainty assessment system can incorporate adaptive capabilities to refine and optimize its evaluation processes over time. In some implementations, the system can modify one or more rules applied by the deterministic model based on the ratings generated for different categories. For example, if a particular category consistently receives ratings that diverge from expected patterns or expert assessments, the system can adjust the thresholds, weightings, or logical conditions within the corresponding rule set. This adaptive approach allows the system to learn from its outputs and align more closely with domain expertise and evolving organizational priorities. The rule modification process can involve statistical analysis of rating distributions, correlation studies between different uncertainty factors, and feedback loops that incorporate human expert input. By continuously refining its rule base, the system can enhance its accuracy, relevance, and responsiveness to changing operational environments and risk landscapes, ensuring that the uncertainty assessments remain valuable and actionable for decision-makers across the organization.

The uncertainty assessment system can output a corresponding assessment, rating, summary, or standardized plurality of data points for each category of the plurality of categories, creating a comprehensive, multidimensional view of the entity's uncertainty profile across numerous operational, strategic, and environmental dimensions. For example, a manufacturing organization can receive assessments across categories including operational stability (examining production consistency, equipment reliability, and process standardization), supply chain resilience (evaluating supplier diversity, geographic distribution, and transportation redundancy), workforce capability (assessing skill availability, training effectiveness, and turnover patterns), technological adaptability (analyzing system flexibility, upgrade pathways, and technical debt), and market responsiveness (evaluating demand forecasting accuracy, production scaling capabilities, and new product introduction processes). Each of these categories represents a distinct dimension of uncertainty that affects the organization's overall risk profile and operational effectiveness. Similarly, a healthcare organization can receive assessments across categories such as patient demand predictability, clinical workforce flexibility, facility utilization optimization, regulatory compliance capability, and technological integration maturity. By examining uncertainty across multiple dimensions rather than producing a single aggregate measure, the system provides a granular view that enables targeted intervention and prioritization based on the specific uncertainty profile of the entity.

In some implementations, the uncertainty assessment system can securely transmit the outputs—including the detailed assessments, multidimensional ratings, and standardized data points—to a regulatory system. This sophisticated transmission process facilitates systematic compliance reporting, comprehensive audit processes, and effective oversight activities across multiple organizational levels and functional areas. The regulatory system can be an external governmental or industry oversight body's data submission portal that facilitates regulatory compliance and industry supervision or an internal governance platform that supports enterprise risk management, operational oversight, and strategic planning that must adhere to regulatory standards. For example, a financial institution can transmit uncertainty assessments to regulatory bodies. A healthcare system can transmit assessments to both internal quality management platforms and external accreditation bodies to demonstrate robust uncertainty management practices and regulatory compliance. The transmission process can be configured to occur at regular intervals (such as quarterly or annual reporting cycles) aligned with regulatory reporting deadlines, upon significant changes in uncertainty profiles (e.g., triggered by predefined thresholds for rating changes), or on demand to support specific regulatory examinations or oversight activities. The system can be configured to transmit different levels of detail to different regulatory recipients based on their specific jurisdictional requirements and oversight scopes, from executive summaries for high-level regulatory reviews to complete detailed assessments for comprehensive regulatory examinations.

The transmission to regulatory systems can involve specialized formatting and security protocols designed specifically for regulatory compliance purposes. The system implements regulatory-specific data schemas and taxonomies that align with formal regulatory reporting frameworks such as those established by Basel Committee on Banking Supervision, the International Organization of Securities Commissions, or industry-specific regulatory bodies. This regulatory-specific formatting ensures that transmitted data meets all technical requirements for automated ingestion and processing by regulatory systems, including proper metadata tagging, standardized field definitions, and required certification elements. The transmission process incorporates regulatory-grade security measures including advanced encryption that meets or exceeds regulatory standards for data protection (such as FIPS 140-2 compliance), multifactor authentication for transmission authorization, comprehensive audit logging that records all transmission activities for regulatory examination purposes, and secure transmission channels that comply with regulatory requirements for data transfer. The system can also implement regulatory-specific validation processes that verify the completeness, accuracy, and consistency of transmitted data according to regulatory reporting standards before transmission occurs, flagging any potential compliance issues for resolution. Additionally, the system maintains comprehensive transmission records that document what information was sent to which regulatory bodies, when it was transmitted, who authorized the transmission, and confirmation of successful receipt—creating a defensible audit trail for demonstrating regulatory compliance. For organizations subject to multiple regulatory regimes, the system can implement jurisdiction-specific transmission protocols that tailor the content, format, and security measures to the specific requirements of each regulatory authority while maintaining consistency in the underlying assessment methodology.

The comprehensive outputs generated by the uncertainty assessment system can drive numerous downstream decision-making processes. The multidimensional nature of these outputs—combining ratings, detailed assessments, and standardized data-enables nuanced analysis and targeted responses across different organizational functions and management levels. For example, categories receiving high uncertainty ratings can be systematically flagged for further investigation, detailed risk assessment, or targeted mitigation efforts, ensuring that limited oversight resources are directed to areas of greatest concern. A manufacturing organization can prioritize supply chain resilience initiatives after assessments reveal high uncertainty in this category across multiple facilities, while a healthcare system can focus on workforce flexibility programs after identifying staffing predictability as a significant uncertainty factor. The detailed assessments provide the context and specificity needed to develop effective responses to identified uncertainty factors, moving beyond generic risk management approaches to targeted interventions that address the specific nature and causes of uncertainty in each area. For example, if an assessment identifies supplier concentration as a key driver of supply chain uncertainty, the organization can develop specific diversification strategies for critical components rather than implementing broad-based inventory increases that can be less effective and more resource-intensive. The standardized data points can inform sophisticated quantitative analyses that support resource allocation optimization, performance benchmarking, and trend monitoring across the organization. These data-driven insights can be particularly valuable for large, complex organizations managing multiple business units or operating locations, as they enable systematic comparison and prioritization across diverse operations.

Figure 6:
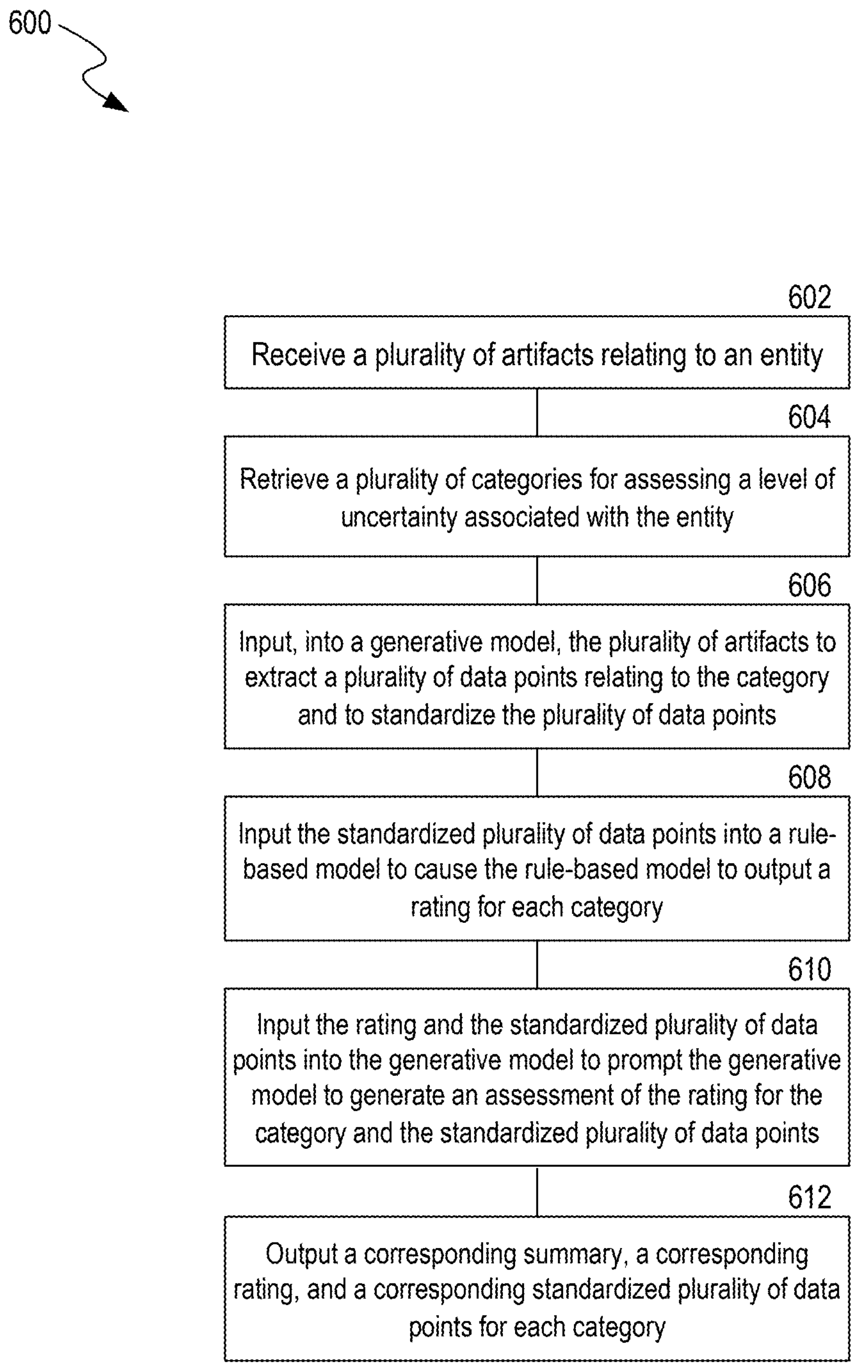
FIG. 6 is a flowchart of operations for analyzing entity uncertainty, in accordance with one or more implementations of this disclosure.
Figure 8:
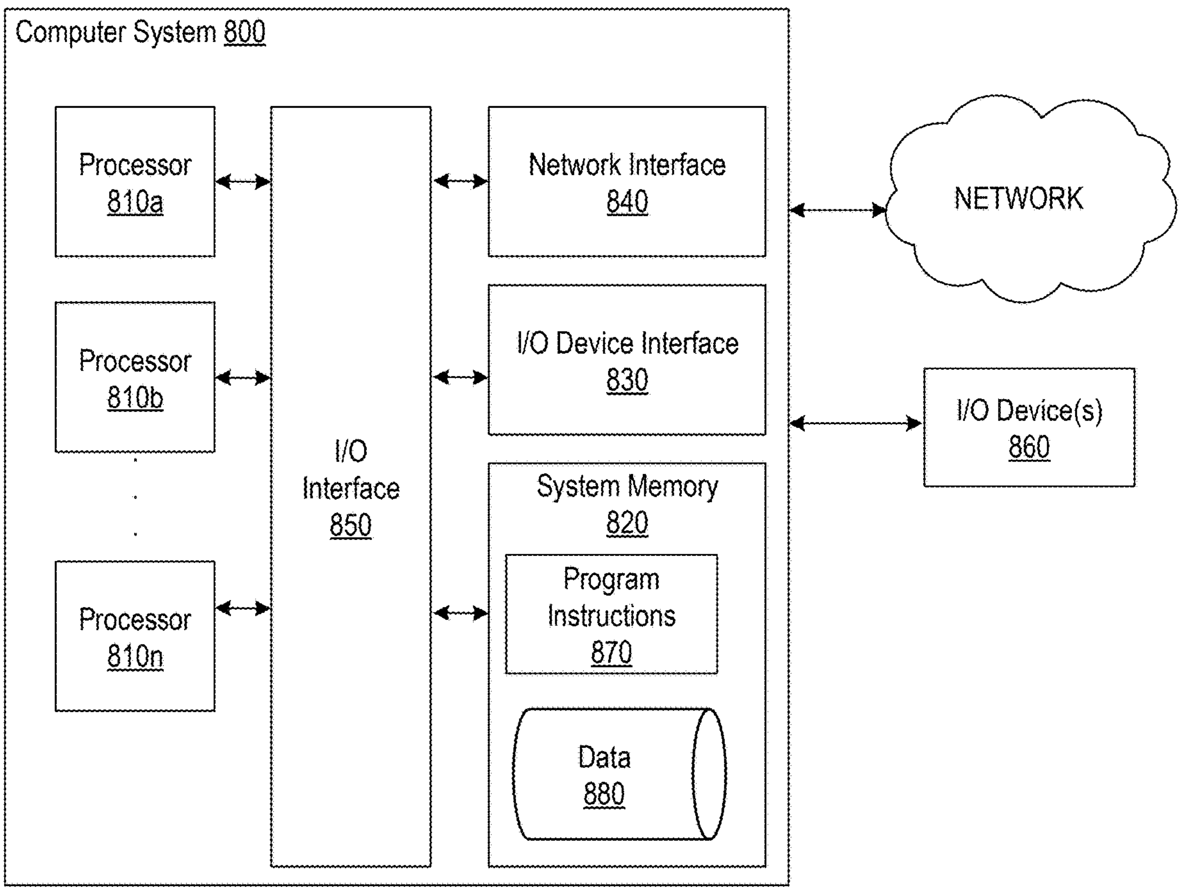
FIG. 8 illustrates an example computing system that can be used in accordance with some implementations of this disclosure.

FIG. 6 is a flowchart 600 of operations for analyzing entity uncertainty, in accordance with one or more implementations of this disclosure. The operations of FIG. 6 can use one or more components described in relation to FIG. 1. In some implementations, the operations of FIG. 6 can use one or more components of computer system 800, as shown in FIG. 8.

At operation 602, the uncertainty assessment system 160 (e.g., using one or more of processors 810*a*-810*n*) can receive a plurality of artifacts relating to an entity. For example, artifacts can include documents (such as annual reports or regulatory filings), strategic plans, marketing materials, or other types of artifacts. In some implementations, the uncertainty assessment system 160 can integrate data from both internal and external data sources to gather comprehensive information about each entity, including operational structure, resource allocation, adaptability measures, and risk profiles. One or more of processors 810*a*-810*n* can receive the artifacts over a communication network using network interface 840.

At operation 604, the uncertainty assessment system 160 (e.g., using one or more of processors 810*a*-810*n*) can retrieve a plurality of categories for assessing a level of uncertainty associated with the entity. For example, the system can retrieve categories such as "Leverage," "Volatility," "Diversification," and "Complexity," each representing a specific aspect of the entity's operations or characteristics that contributes to its overall uncertainty level. These categories can be predefined based on industry standards, regulatory requirements, or organizational policies. One or more of processors 810*a*-810*n* can retrieve the categories over a communication network using network interface 840.

At operation 606, the uncertainty assessment system 160 (e.g., using one or more of processors 810*a*-810*n*) can input, into a generative model, the plurality of artifacts to extract a plurality of data points relating to the category and to standardize the plurality of data points, for example, according to a plurality of criteria. For example, for the "Complexity" category, the generative model can extract data points relating to queries such as, "What is the maximum number of approval layers specified in the governance documentation?" and "What simplification initiatives are documented for reducing operational complexity?" The generative model then standardizes the retrieved data points according to predefined criteria, ensuring consistent formatting, normalized values, and structured relationships that can be readily ingested by deterministic models in subsequent processing steps.

At operation 608, the uncertainty assessment system 160 (e.g., using one or more of processors 810*a*-810*n*) can input the standardized plurality of data points into a rule-based model to cause the rule-based model to output a rating for each category. For example, the system can input the standardized data points about complexity into a rule-based model that applies specific rules such as, "If no simplification initiatives documented, assign an uncertainty rating of 7 out of 10." The rule-based model processes and combines the inputs according to predefined logical frameworks to generate a consistent and explainable rating for the category.

At operation 610, the uncertainty assessment system 160 (e.g., using one or more of processors 810*a*-810*n*) can input the rating and the standardized plurality of data points into the generative model to prompt the generative model to generate, according to a predefined structure, an assessment of the rating for the category and the standardized plurality of data points. For example, if the "Complexity" category received a "High Uncertainty" rating, the system inputs this rating, along with the standardized data points, back into the generative model. The generative model then creates a structured assessment that explains the rating, supported by relevant data points, following a consistent format that can include sections for executive summary, detailed analysis, and supporting evidence.

At operation 612, the uncertainty assessment system 160 (e.g., using one or more of processors 810*a*-810*n*) can output a corresponding summary, a corresponding rating, and a corresponding standardized plurality of data points for each category of the plurality of categories. For example, the system outputs a comprehensive package for each category that includes a detailed narrative assessment explaining the uncertainty factors, the specific numerical or qualitative rating assigned by the rule-based model, and the complete set of standardized data points that formed the basis for the assessment. This output provides a multidimensional view of the entity's uncertainty profile across various operational, strategic, and environmental dimensions, enabling sophisticated analysis and informed decision-making.

Figure 7:
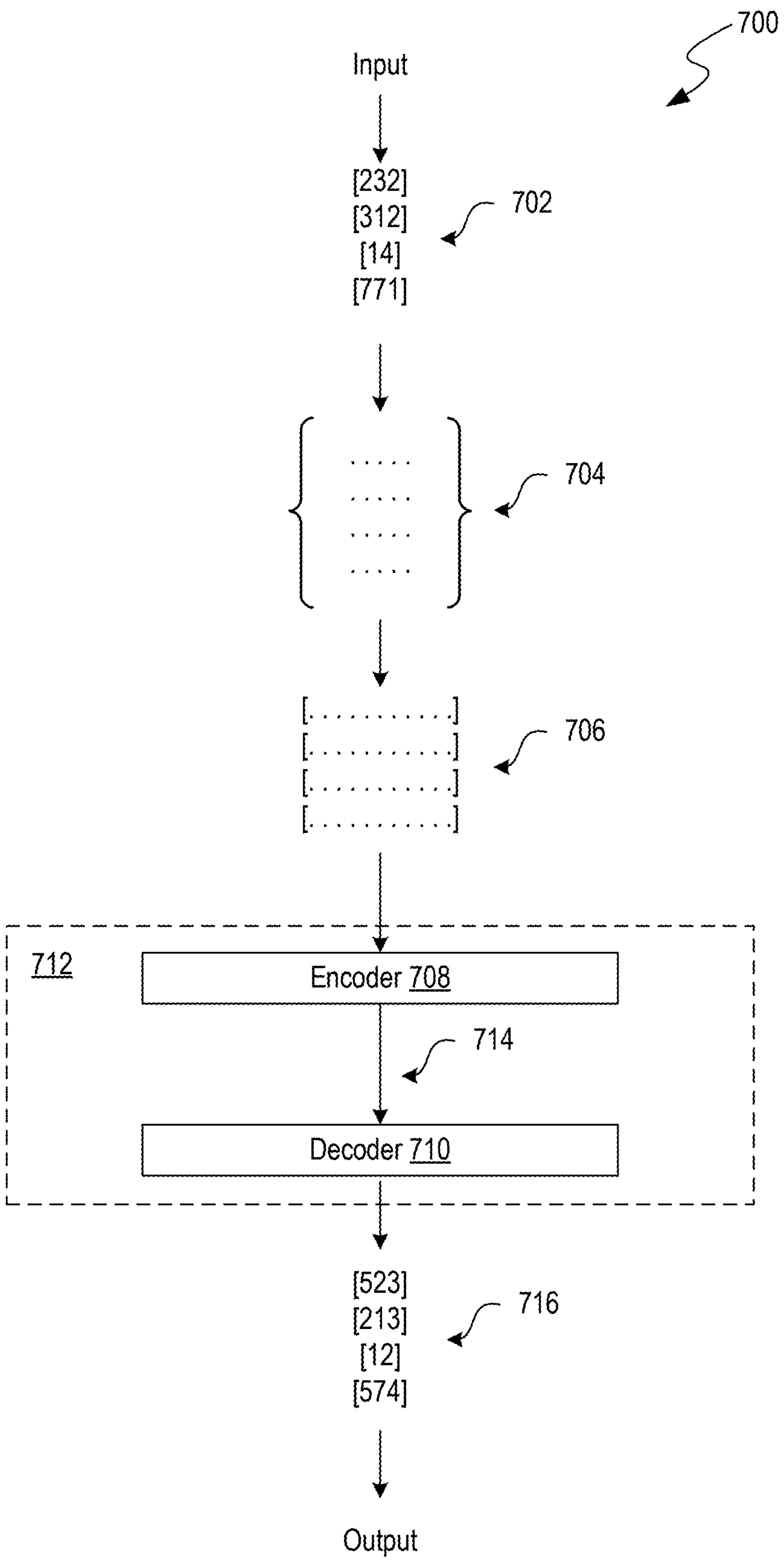
FIG. 7 is a block diagram of an example transformer used to analyze entity uncertainty, in accordance with one or more implementations of this disclosure.

FIG. 7 is a block diagram 700 of an example transformer used to analyze entity uncertainty, in accordance with one or more implementations of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure can be applicable to any machine learning-based language model, including language models based on other neural network architectures, such as recurrent neural network (RNN)-based language models.

The transformer 712 includes an encoder 708 (which can include one or more encoder layers/blocks connected in series) and a decoder 710 (which can include one or more decoder layers/blocks connected in series). Generally, the encoder 708 and the decoder 710 each include multiple neural network layers, at least one of which can be a self-attention layer. The parameters of the neural network layers can be referred to as the parameters of the language model.

The transformer 712 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of names for a startup or costumes for an upcoming party. Writing a rough draft can include generating writing in a particular style that can be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 712 is trained to perform certain functions on input formats other than natural language input. For example, the input can include objects, images, audio content, video content, or a combination thereof.

The transformer 712 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture) unless stated otherwise. Some LLMs can be trained on a large multi-language, multi-domain corpus to enable the model to be versatile at a variety of language-based tasks, such as generative tasks (e.g., generating human-like natural language responses to natural language input).

FIG. 7 illustrates how the transformer 712 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

As shown in the block diagram 700, a short sequence of tokens 702 corresponding to the input text is illustrated as input to the transformer 712. Tokenization of the text sequence into the tokens 702 can be performed by some pre-processing tokenization module such as, for example, a byte-pair encoding tokenizer (the "pre" referring to the tokenization occurring prior to the processing of the tokenized input by the LLM), which is not shown in FIG. 7 for brevity. In general, the token sequence that is inputted to the transformer 712 can be of any length up to a maximum length defined based on the dimensions of the transformer 712. Each token 702 in the token sequence is converted into an embedding 706 (also referred to as an "embedding vector").

An embedding 706 is a learned numerical representation (such as, for example, a vector) of a token that captures some semantic meaning of the text segment represented by the token 702. The embedding 706 represents the text segment corresponding to the token 702 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 706 corresponding to the "write" token will be closer to another embedding corresponding to the "jot down" token in the vector space as compared to the distance between the embedding 706 corresponding to the "write" token and another embedding corresponding to the "summary" token.

The vector space can be defined by the dimensions and values of the embedding vectors. Various techniques can be used to convert a token 702 to an embedding 706. For example, another trained machine learning model can be used to convert the token 702 into an embedding 706. In particular, another trained machine learning model can be used to convert the token 702 into an embedding 706 in a way that encodes additional information into the embedding 706 (e.g., a trained machine learning model can encode positional information about the position of the token 702 in the text sequence into the embedding 706). In some implementations, the numerical value of the token 702 can be used to look up the corresponding embedding in an embedding matrix 704, which can be learned during training of the transformer 712.

The generated embeddings, e.g., such as the embedding 706, are input into the encoder 708. The encoder 708 serves to encode the embedding 706 into feature vectors 714 that represent the latent features of the embedding 706. The encoder 708 can encode positional information (i.e., information about the sequence of the input) in the feature vectors 714. The feature vectors 714 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 714, that can be generated by the encoder 708 can be referred to as a latent space or feature space.

Conceptually, the decoder 710 is designed to map the features represented by the feature vectors 714 into meaningful output, which can depend on the task that was assigned to the transformer 712. For example, if the transformer 712 is used for a translation task, the decoder 710 can map the feature vectors 714 into text output in a target language different from the language of the original tokens 702. Generally, in a generative language model, the decoder 710 serves to decode the feature vectors 714 into a sequence of tokens. The decoder 710 can generate output tokens 716 one by one. Each output token 716 can be fed back as input to the decoder 710 in order to generate the next output token 716. By feeding back the generated output and applying self-attention, the decoder 710 can generate a sequence of output tokens 716 that has sequential meaning (e.g., the resulting output text sequence is understandable as a sentence and obeys grammatical rules). The decoder 710 can generate output tokens 716 until a special [EOT] token (indicating the end of the text) is generated. The resulting sequence of output tokens 716 can then be converted to a text sequence in post-processing. For example, each output token 716 can be an integer number that corresponds to a vocabulary index. By looking up the text segment using the vocabulary index, the text segment corresponding to each output token 716 can be retrieved, the text segments can be concatenated together, and the final output text sequence can be obtained.

In some implementations, the input provided to the transformer 712 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user, and the output can include a high-level summary of the meeting notes. In other examples, the input provided to the transformer includes a question or a request to generate text. The output can include a response to the question, text associated with the request, or a list of ideas associated with the request. For example, the input can include the question, "What is the weather like in San Francisco?" and the output can include a description of the weather in San Francisco. As another example, the input can include a request to brainstorm names for a flower shop, and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). Bidirectional Encoder Representations from Transformers (BERT) is an example of a language model that can be considered to be an encoder-only language model. A decoder-only language model accepts embeddings as input and can use auto-regression to generate an output text sequence. Transformer-XL and Generative Pre-trained Transformer (GPT)-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,047 input tokens), and is able to generate a large number of tokens as output (e.g., up to 2,047 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

The above-described implementations of the present disclosure are presented for purposes of illustration, not of limitation, and the present disclosure is limited only by the claims which follow. Furthermore, it should be noted that the features and limitations described in any one implementation can be applied to any other implementation herein, and flowcharts or examples relating to one implementation can be combined with any other implementation in a suitable manner, done in different orders, or done in parallel. In addition, the systems and methods described herein can be performed in real time. It should also be noted that the systems or methods described above can be applied to, or used in accordance with, other systems or methods.

FIG. 8 shows an example computing system that can be used in accordance with some implementations of this disclosure. In some instances, computing system 800 is referred to as a computer system 800. A person skilled in the art would understand that those terms can be used interchangeably. The components of FIG. 8 can be used to perform some or all operations discussed in relation to FIGS. 1-8. Furthermore, various portions of the systems and methods described herein can include or be executed on one or more computer systems similar to computing system 800. Further, processes and modules described herein can be executed by one or more processing systems similar to that of computing system 800.

Computing system 800 can include one or more processors (e.g., processors 810*a*-810*n*) coupled to system memory 820, an input/output (I/O) device interface 830, and a network interface 840 via an I/O interface 850. A processor can include a single processor or a plurality of processors (e.g., distributed processors). A processor can be any suitable processor capable of executing or otherwise performing instructions. A processor can include a central processing unit (CPU) that carries out program instructions to perform the arithmetical, logical, and I/O operations of computing system 800. A processor can execute code (e.g., processor firmware, a protocol stack, a database management system, an operating system, or a combination thereof) that creates an execution environment for program instructions.

A processor can include a programmable processor. A processor can include general or special-purpose microprocessors. A processor can receive instructions and data from a memory (e.g., system memory 820). Computing system 800 can be a uni-processor system including one processor (e.g., processor 810*a*) or a multiprocessor system including any number of suitable processors (e.g., 810*a*-810*n*). Multiple processors can be employed to provide for parallel or sequential execution of one or more portions of the techniques described herein. Processes, such as logic flows, described herein can be performed by one or more programmable processors executing one or more computer programs to perform functions by operating on input data and generating corresponding output. Processes described herein can be performed by, and apparatus can also be implemented as, special-purpose logic circuitry, e.g., an FPGA (field-programmable gate array) or an ASIC (application-specific integrated circuit). Computing system 800 can include a plurality of computing devices (e.g., distributed computer systems) to implement various processing functions.

I/O device interface 830 can provide an interface for connection of one or more I/O devices 860 to computer system 800. I/O devices can include devices that receive input (e.g., from a user) or output information (e.g., to a user). I/O devices 860 can include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 can be connected to computer system 800 through a wired or wireless connection. I/O devices 860 can be connected to computer system 800 from a remote location. I/O devices 860 located on remote computer systems, for example, can be connected to computer system 800 via a network and network interface 840.

The I/O device interface 830 and I/O devices 860 can be used to enable manipulation of the three-dimensional model as well. For example, the user can be able to use I/O devices such as a keyboard and touchpad to indicate specific selections for nodes, adjust values for nodes, select from the history of machine learning models, select specific inputs or outputs, or the like. Alternatively or additionally, the user can use their voice to indicate specific nodes, specific models, or the like via the voice recognition device or microphones.

Network interface 840 can include a network adapter that provides for connection of computer system 800 to a network. Network interface 840 can facilitate data exchange between computer system 800 and other devices connected to the network. Network interface 840 can support wired or wireless communication. The network can include an electronic communication network, such as the internet, a LAN, a WAN, a cellular communications network, or the like.

System memory 820 can be configured to store program instructions 870 or data 880. Program instructions 870 can be executable by a processor (e.g., one or more of processors 810*a*-810*n*) to implement one or more implementations of the present techniques. Program instructions 870 can include modules of computer program instructions for implementing one or more techniques described herein with regard to various processing modules. Program instructions can include a computer program (which in certain forms is known as a program, software, software application, script, or code). A computer program can be written in a programming language, including compiled or interpreted languages, or declarative or procedural languages. A computer program can include a unit suitable for use in a computing environment, including as a stand-alone program, a module, a component, or a subroutine. A computer program can correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one or more computer processors located locally at one site or distributed across multiple remote sites and interconnected by a communication network.

System memory 820 can include a tangible program carrier having program instructions stored thereon. A tangible program carrier can include a non-transitory, computer-readable storage medium. A non-transitory, computer-readable storage medium can include a machine-readable storage device, a machine-readable storage substrate, a memory device, or any combination thereof. A non-transitory, computer-readable storage medium can include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 820 can include a non-transitory, computer-readable storage medium that can have program instructions stored thereon that are executable by a computer processor (e.g., one or more of processors 810*a*-810*n*) to cause the subject matter and the functional operations described herein. A memory (e.g., system memory 820) can include a single memory device or a plurality of memory devices (e.g., distributed memory devices).

I/O interface 850 can be configured to coordinate I/O traffic between processors 810*a*-810*n*, system memory 820, network interface 840, I/O devices 860, or other peripheral devices. I/O interface 850 can perform protocol, timing, or other data transformations to convert data signals from one component (e.g., system memory 820) into a format suitable for use by another component (e.g., processors 810*a*-810*n*). I/O interface 850 can include support for devices attached through various types of peripheral buses, such as a variant of the Peripheral Component Interconnect (PCI) bus standard or the Universal Serial Bus (USB) standard.

Implementations of the techniques described herein can be implemented using a single instance of computer system 800 or multiple computer systems 800 configured to host different portions or instances of implementations. Multiple computer systems 800 can provide for parallel or sequential processing/execution of one or more portions of the techniques described herein.

Those skilled in the art will appreciate that computer system 800 is merely illustrative and is not intended to limit the scope of the techniques described herein. Computer system 800 can include any combination of devices or software that can perform or otherwise provide for the performance of the techniques described herein. For example, computer system 800 can include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 800 can also be connected to other devices that are not illustrated or can operate as a stand-alone system. In addition, the functionality provided by the illustrated components can, in some implementations, be combined in fewer components or be distributed in additional components. Similarly, in some implementations, the functionality of some of the illustrated components is not provided, or other additional functionality is available.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can not only include additional elements to those implementations noted above but can also include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

We claim:

1. One or more non-transitory, computer-readable storage medium comprising instructions recorded thereon, wherein the instructions, when executed by at least one data processor of a system, cause the system to:

receive a plurality of documents relating to an entity;

retrieve a plurality of categories for assessing a level of uncertainty associated with the entity, wherein each category corresponds to a type of uncertainty associated with the entity;

for each category of the plurality of categories:

input, into a node of a large language model (LLM), the plurality of documents and the category to generate a plurality of data points relating to the category and to standardize the plurality of data points according to a plurality of criteria, wherein the plurality of criteria ensures the standardized plurality of data points is ingestible by deterministic models, and wherein the system adapts to multiple languages or evolving terminology within the plurality of documents through semantic understanding capabilities;

input the standardized plurality of data points into a deterministic model to cause the deterministic model to output a rating for the category, wherein the deterministic model is trained to apply one or more consistent rules for determining the rating for the category; and input the rating, the standardized plurality of data points, and an intended recipient into the LLM to generate, according to a predefined structure, an assessment of (i) the rating for the category and (ii) the standardized plurality of data points, wherein the LLM generates the assessment in a human-like, natural language format and adapts a communication style and a technical depth of the assessment based on the intended recipient of the assessment;

modify, based on at least one rating for at least one category of the plurality of categories, at least one rule of the one or more rules applied by the deterministic model;

transmit, to a regulatory system, a corresponding assessment, a corresponding rating, and a corresponding standardized plurality of data points for each category of the plurality of categories; and output, to a corresponding intended recipient, the corresponding assessment, the corresponding rating, and the corresponding standardized plurality of data points.

2. The one or more non-transitory, computer-readable storage medium of claim 1, wherein each category is associated with a plurality of queries, and wherein the instructions for prompting the LLM to retrieve the plurality of data points relating to the category and to standardize the plurality of data points further cause the system to:

prompt the LLM to retrieve an initial plurality of data points relating to an initial query of the plurality of queries;

determine a subsequent query of the plurality of queries based on the initial plurality of data points;

prompt the LLM to retrieve a subsequent plurality of data points relating to the subsequent query; and prompt the LLM to standardize the initial plurality of data points and the subsequent plurality of data points.

3. The one or more non-transitory, computer-readable storage medium of claim 2, wherein the instructions for inputting the standardized plurality of data points into the deterministic model further cause the system to input, into the deterministic model, the standardized initial plurality of data points and the standardized subsequent plurality of data points to cause the model to output the rating for the category.

4. The one or more non-transitory, computer-readable storage medium of claim 1, wherein the instructions for prompting the LLM to retrieve the plurality of data points and to standardize the plurality of data points further cause the system to input, to the LLM, a first prompt instructing the LLM to follow a first plurality of procedures for data transformation of the plurality of data points.

5. The one or more non-transitory, computer-readable storage medium of claim 1, wherein the instructions for inputting the rating and the standardized plurality of data points into the LLM to prompt the LLM to generate the assessment further cause the system to input, into the LLM, a second prompt instructing the LLM to follow a second plurality of procedures for summarizing the rating and the standardized plurality of data points, the second plurality of procedures indicating a subset of the standardized plurality of data points to be emphasized in the assessment.

6. The one or more non-transitory, computer-readable storage medium of claim 1, wherein the LLM further outputs a plurality of citations to the plurality of documents, the plurality of citations corresponding to the plurality of data points.

7. A method comprising:

receiving a plurality of artifacts relating to an entity;

retrieving a plurality of categories for assessing a level of uncertainty associated with the entity;

for each category of the plurality of categories:

inputting, into a generative model, the plurality of artifacts to extract a plurality of data points relating to the category and to standardize the plurality of data points according to a plurality of criteria, wherein the plurality of artifacts comprises multiple languages or evolving terminology;

inputting the standardized plurality of data points into a rule-based model to cause the rule-based model to output a rating for the category; and inputting the rating, the standardized plurality of data points, and an intended recipient into the generative model to prompt the generative model to generate, according to a predefined structure, an assessment of the rating for the category and the standardized plurality of data points, wherein the generative model adapts a communication style and a technical depth of the assessment based on the intended recipient of the assessment; and outputting, to a corresponding intended recipient, a corresponding summary, a corresponding rating, and a corresponding standardized plurality of data points for each category of the plurality of categories.

8. The method of claim 7, wherein each category is associated with a plurality of queries, and wherein prompting the generative model to retrieve the plurality of data points relating to the category and to standardize the plurality of data points further comprises:

prompting the generative model to retrieve an initial plurality of data points relating to an initial query of the plurality of queries;

determining a subsequent query of the plurality of queries based on the initial plurality of data points;

prompting the generative model to retrieve a subsequent plurality of data points relating to the subsequent query; and prompting the generative model to standardize the initial plurality of data points and the subsequent plurality of data points.

9. The method of claim 8, wherein inputting the standardized plurality of data points into the rule-based model further comprises inputting, into the rule-based model, the standardized initial plurality of data points and the standardized subsequent plurality of data points to cause the model to output the rating for the category.

10. The method of claim 7, wherein prompting the generative model to retrieve the plurality of data points and to standardize the plurality of data points further comprises inputting, to the generative model, a first prompt instructing the generative model to follow a first plurality of procedures for data transformation of the plurality of data points.

11. The method of claim 7, wherein inputting the rating and the standardized plurality of data points into the generative model to prompt the generative model to generate the assessment further comprises inputting, into the generative model, a second prompt instructing the generative model to follow a second plurality of procedures for summarizing the rating and the standardized plurality of data points, the second plurality of procedures indicating a subset of the standardized plurality of data points to be emphasized in the assessment.

12. The method of claim 7, wherein the generative model further outputs a plurality of citations to the plurality of artifacts, the plurality of citations corresponding to the plurality of data points.

13. The method of claim 7, wherein the rule-based model applies one or more rules for determining the rating for the category.

14. A system comprising:

a storage device; and one or more processors communicatively coupled to the storage device storing instructions thereon that cause the one or more processors to:

receive a plurality of artifacts relating to an entity;

receive a plurality of categories for assessing a level of uncertainty associated with the entity;

for each category of the plurality of categories:

prompt a generative model to retrieve, from the plurality of artifacts, a plurality of data points relating to the category and to standardize the plurality of data points according to a plurality of criteria;

input the standardized plurality of data points into a rule-based model to cause the rule-based model to output a rating for the category; and input the rating, the standardized plurality of data points, and an intended recipient into the generative model to prompt the generative model to generate, according to a predefined structure, an assessment of the rating for the category and the standardized plurality of data points, wherein the generative model adapts a communication style and a technical depth of the assessment based on the intended recipient of the assessment; and output, to a corresponding intended recipient, a corresponding summary, a corresponding rating, and a corresponding standardized plurality of data points for each category of the plurality of categories.

15. The system of claim 14, wherein each category is associated with a plurality of queries, and wherein the instructions for prompting the generative model to retrieve the plurality of data points relating to the category and to standardize the plurality of data points further cause the one or more processors to:

prompt the generative model to retrieve an initial plurality of data points relating to an initial query of the plurality of queries;

determine a subsequent query of the plurality of queries based on the initial plurality of data points;

prompt the generative model to retrieve a subsequent plurality of data points relating to the subsequent query; and prompt the generative model to standardize the initial plurality of data points and the subsequent plurality of data points.

16. The system of claim 15, wherein the instructions for inputting the standardized plurality of data points into the rule-based model further cause the one or more processors to input, into the rule-based model, the standardized initial plurality of data points and the standardized subsequent plurality of data points to cause the model to output the rating for the category.

17. The system of claim 14, wherein the instructions for prompting the generative model to retrieve the plurality of data points and to standardize the plurality of data points further cause the one or more processors to input, to the generative model, a first prompt instructing the generative model to follow a first plurality of procedures for data transformation of the plurality of data points.

18. The system of claim 14, wherein the instructions for inputting the rating and the standardized plurality of data points into the generative model to prompt the generative model to generate the assessment further cause the one or more processors to input, into the generative model, a second prompt instructing the generative model to follow a second plurality of procedures for summarizing the rating and the standardized plurality of data points, the second plurality of procedures indicating a subset of the standardized plurality of data points to be emphasized in the assessment.

19. The system of claim 14, wherein the generative model further outputs a plurality of citations to the plurality of artifacts, the plurality of citations corresponding to the plurality of data points.

20. The system of claim 14, wherein the rule-based model applies one or more rules for determining the rating for the category, and wherein the instructions further cause the one or more processors to modify the one or more rules based on a statistical analysis of rating distributions of the corresponding rating for each category of the plurality of categories.

* * * * *